United States Patent [19]

Yamada

[11] Patent Number: 4,531,459
[45] Date of Patent: Jul. 30, 1985

[54] STANDING POSITION SUPPORT APPARATUS FOR AMUSEMENT VEHICLE

[75] Inventor: Kazuo Yamada, Tokyo, Japan

[73] Assignee: Togo Japan Inc., Tokyo, Japan

[21] Appl. No.: 433,275

[22] Filed: Oct. 7, 1982

[30] Foreign Application Priority Data

Oct. 12, 1981 [JP] Japan .................................. 56-162195
Apr. 22, 1982 [JP] Japan .................................. 57-67926
Apr. 22, 1982 [JP] Japan .................................. 57-67927
Apr. 22, 1982 [JP] Japan .................................. 57-67928

[51] Int. Cl.³ .............................................. A63G 21/04
[52] U.S. Cl. ......................................... 104/53; 104/63; 128/134; 272/44
[58] Field of Search .......... 104/25, 53, 63, 82, 104/241; 128/1 A, 133, 134; 198/321, 324; 244/4 A, 122 AG; 272/33, 36, 43, 44, 112, 120, 134, 143, 144; 280/751; 297/DIG. 10

[56] References Cited

U.S. PATENT DOCUMENTS

| | | | |
|---|---|---|---|
| 3,640,572 | 2/1972 | Doehler | 280/751 X |
| 4,054,319 | 10/1977 | Fogg, Jr. et al. | 297/DIG. 10 X |
| 4,299,321 | 11/1981 | Hermawan | 104/25 X |
| 4,359,200 | 11/1982 | Brevard et al. | 244/122 AG |
| 4,372,551 | 2/1983 | Yurdin | 272/134 X |
| 4,372,552 | 2/1983 | Carlmark | 272/112 |
| 4,390,076 | 6/1983 | Wier et al. | 297/DIG. 10 X |

FOREIGN PATENT DOCUMENTS 2476581 8/1981 France .............................. 104/118
51-100531 9/1976 Japan .
52-632 1/1977 Japan .

Primary Examiner—Robert B. Reeves
Assistant Examiner—David F. Hubbuch
Attorney, Agent, or Firm—Merchant, Gould, Smith, Edell, Welter & Schmidt

[57] ABSTRACT

The invention provides a standing position support apparatus having: a standing position support column for holding a passenger in an upright posture on a main body of a vehicle which rolls or orbits along a track; a height-adjusting frame which is disposed at the standing position support column to be vertically movable therealong and adjusted at a proper position in accordance with the height of the passenger and which has a locking mechanism for locking the height-adjusting frame; and a body safety support mechanism having a pair of right and left shoulder holders which are free to pivot and support the upper half of the body (e.g., surrounding of the shoulders) of the passenger, a saddle for supporting the pelvic portion of the body, and an abdominal support for supporting the lower torso of the passenger. With the standing room apparatus, the passenger can be safely held to stand on the main body while it is in motion and can enjoy thrilling excitement as if he were standing on the main body by himself.

14 Claims, 43 Drawing Figures

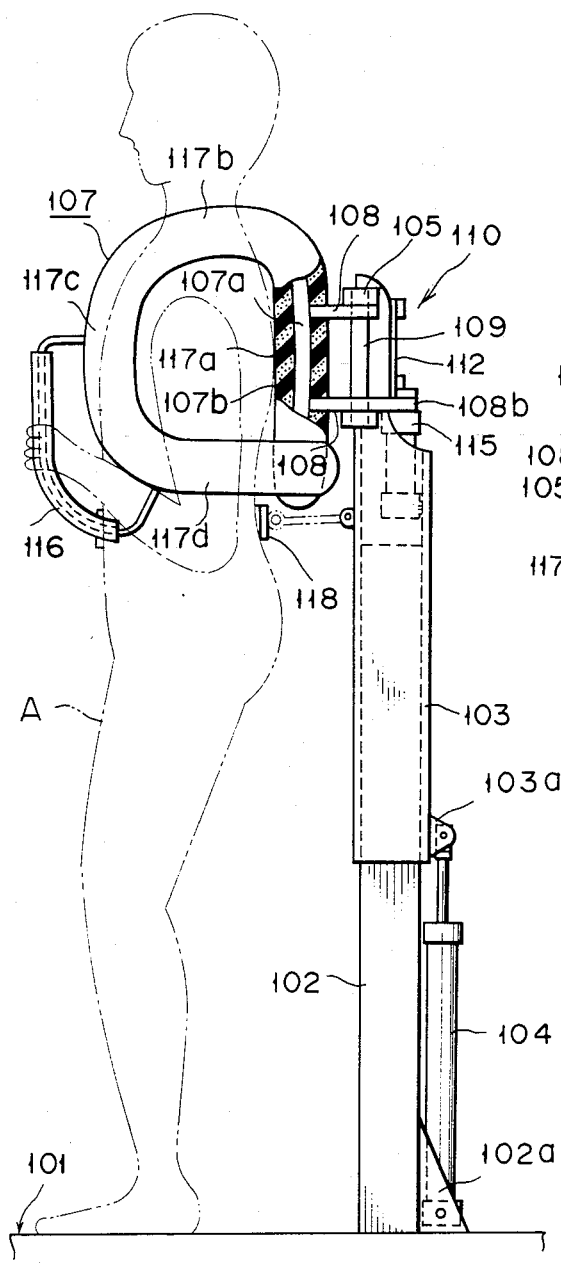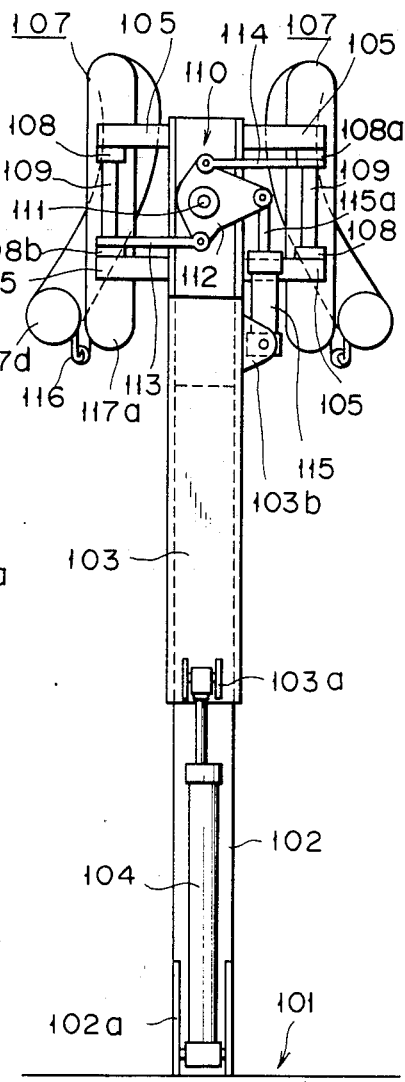

FIG. 42
FIG. 43
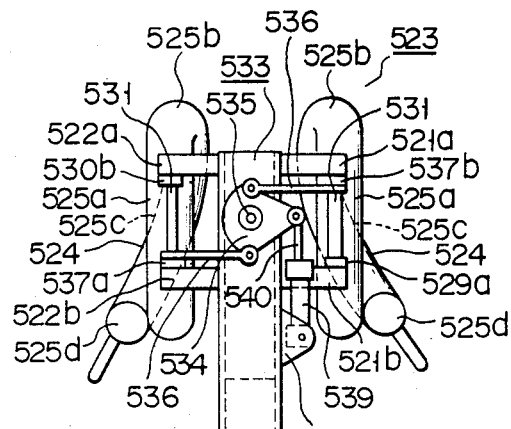
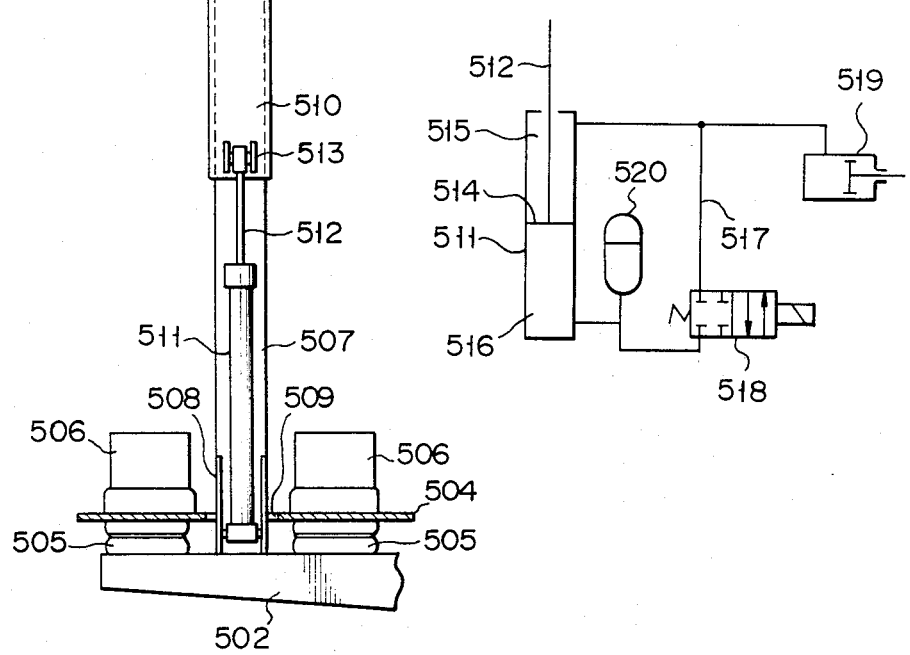

4,531,459

STANDING POSITION SUPPORT APPARATUS FOR AMUSEMENT VEHICLE

BACKGROUND OF THE INVENTION

The present invention relates to a standing position support apparatus for a roller coaster, a somersault coaster or any other amusement vehicle which rolls or orbits along a track in an amusement park or the like and, more particularly, to a standing position support apparatus for safely holding a passenger who stands on the amusement vehicle.

The present applicant has developed an amusement vehicle, a typical example of which is a so-called standing loop coaster. The passenger is held standing on the standing loop coaster, while the standing loop coaster moves along the track performing nose dives, turns and somersaults, thereby providing thrilling amusement which cannot be obtained from any other coaster. Unlike the conventional roller and somersault coasters where passengers sit deeply in their seats to maintain a lower center of gravity, the passenger maintains a higher center of gravity and his eye level is higher in the standing loop coaster, thus greatly increasing the feelings of zero gravity and speed and providing more thrilling sensations.

The safety of passengers in the standing loop coaster must be maintained while it is in motion. Overloads such as excessive gravity (G) due to transverse vibration and nose dive acceleration must not be imposed on the standing passenger. Even if the passenger faints while the standing loop coaster is in motion, the standing posture of the passenger must be maintained to protect him. For these purposes, a body support unit must be provided which may be used by passengers of different heights. Such a unit must ensure the safety of the passengers as well as provide thrilling amusement.

SUMMARY OF THE INVENTION

The present invention has been made in consideration of the above situation, and it is a first object of the present invention to provide a standing position support apparatus for an amusement vehicle, having a body support mechanism for supporting the upper half of the body of a passenger such as the shoulders or belly, or hips on a standing column disposed upright on a vehicle main body so as to be suitable for passengers who have different figures (e.g., tall, short, fat, slender), in order to maintain the safety of the passenger.

It is a second object of the present invention to provide a standing position support apparatus for an amusement vehicle which assures the safety of the passenger standing therein when a gravity overload is imposed on the body of the passenger, by immediately damping the overload.

It is a third object of the present invention to provide a standing position support apparatus for an amusement vehicle which provides further thrills by arbitrarily changing the posture of the passenger standing in an amusement vehicle of this type which has a safeguard.

BRIEF DESCRIPTION OF THE DRAWINGS

FIG. 14 is a side view of a standing position support apparatus according to a third embodiment of the present invention with the main part being cut away;

FIG. 15 is a rear view of the standing position support apparatus shown in FIG. 14;

FIG. 42 is a rear view of the standing position support apparatus shown in FIG. 40; and FIG. 43 is a view showing the hydraulic locking cylinder of the standing position support apparatus shown in FIG. 40.

DETAILED DESCRIPTION OF THE PREFERRED EMBODIMENTS

A standing position support apparatus according to a first embodiment of the present invention will be described with reference to the accompanying drawings. In this embodiment, a standing loop coaster is exemplified as an amusement vehicle.

Figure 1:
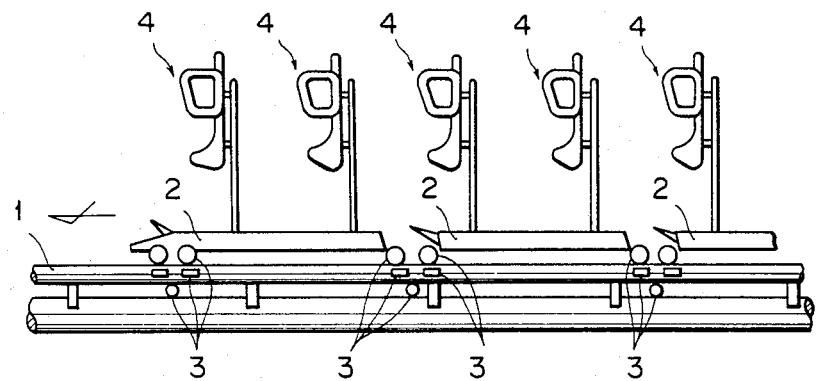
FIG. 1 is a schematic view of a standing loop coaster having standing position support apparatuses according to a first embodiment of the present invention.

Referring to FIG. 1, reference numeral 1 denotes a track of the coaster; and 2, a plurality of vehicle main bodies on flat trucks which roll along the track 1 via wheels 3. The flat truck does not have a box-shaped body for accomodating passengers therein, but has a flat upper surface. One or two rows of the standing position support apparatuses 4 are disposed on the upper surface of each main body 2 to be spaced apart from each other at a predetermined distance. Passengers are respectively supported by the standing position support apparatuses 4.

Figure 4:
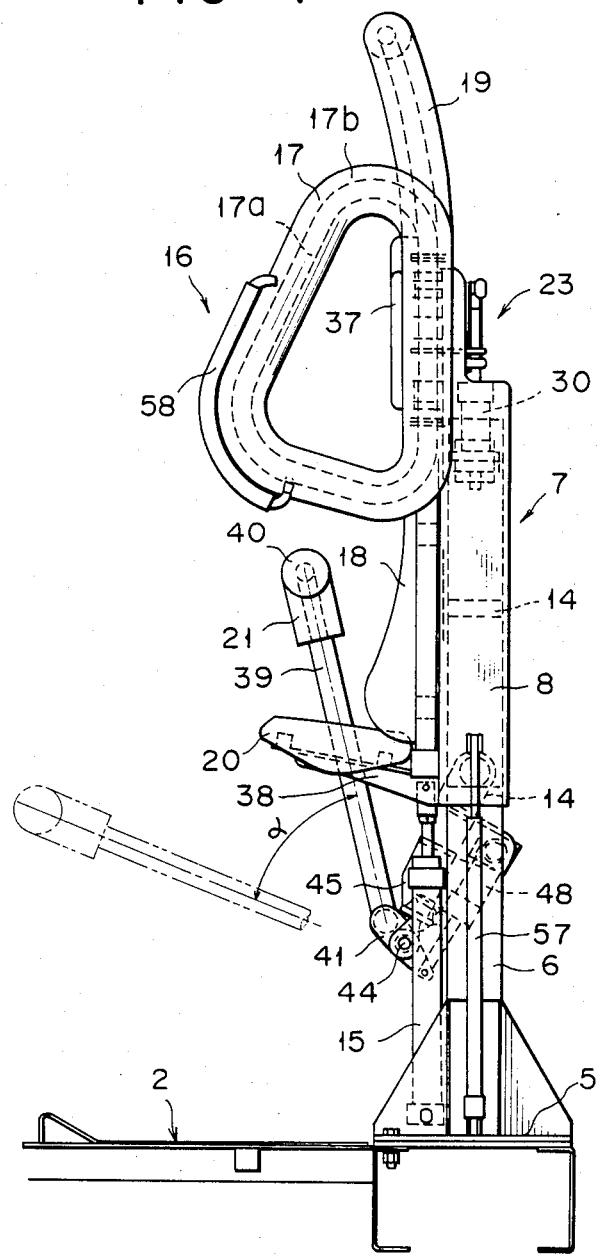
FIG. 4 is a right side view of the standing position support apparatus shown in FIG. 1.
Figure 5:
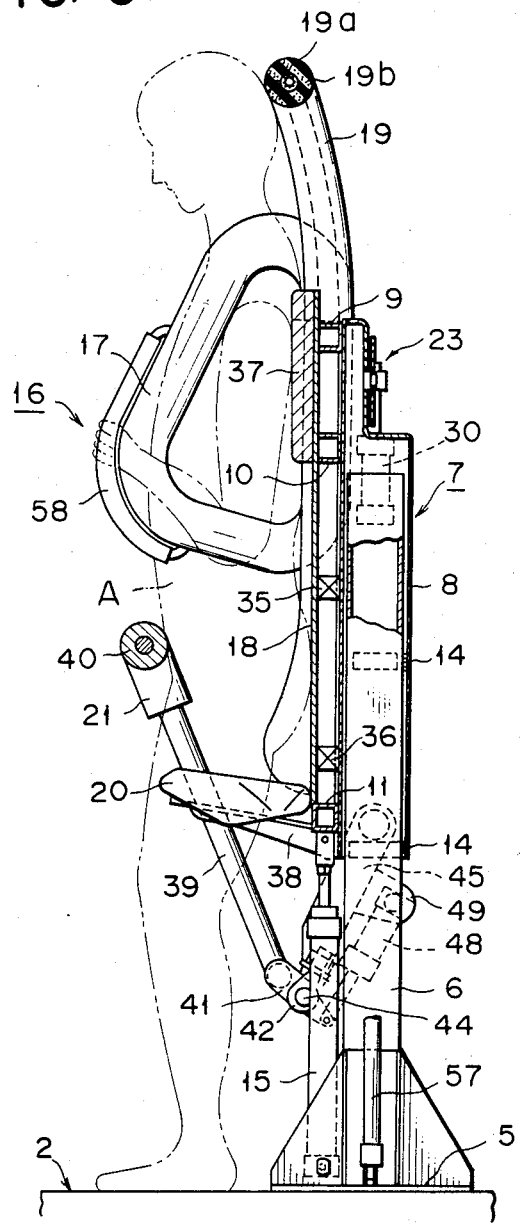
FIG. 5 is a central longitudinal sectional view showing a passenger supporting state of the standing position support apparatus shown in FIG. 1.
Figure 6:
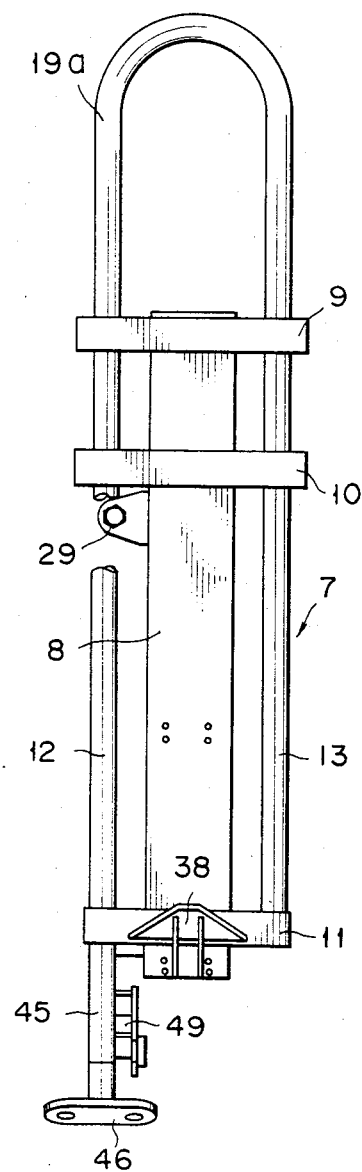
FIG. 6 is a front view of a height-adjusting frame of the standing position support apparatus shown in FIG. 1.
Figure 7:
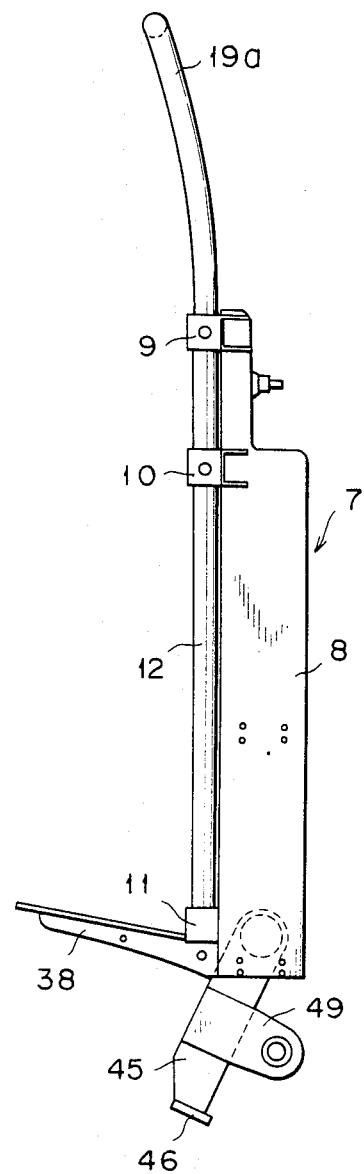
FIG. 7 is a right side view of the height-adjusting frame shown in FIG. 6.

The structure of the standing position support apparatus 4 according to the present invention will be described in detail with reference to FIGS. 2 to 8. The standing position support apparatus 4 comprises a standing column 6 disposed upright on the main body 2 through a base 5, and a height-adjusting frame 7 which is vertically movable along the standing column 6. The height-adjusting frame 7 comprises a prism-shaped cylinder 8 which is vertically movable around the standing column 6 having a square cross-section, three horizontal frame members 9 to 11 which are welded at the front side of the cylinder 8 (two horizontal frame members 9 and 11 are disposed at the upper and lower portions of the cylinder 8, and the remaining horizontal frame member 10 is spaced apart from the horizontal frame member 9 as shown in FIGS. 6 and 7), and vertical left and right frame members 12 and 13, respectively, each of which is connected to one end of each of the two horizontal frame members 9 to 11. Sliders 14 made of teflon liner are respectively fixed inside the lower end and the intermediate portion of the cylinder 8 to slide along the standing column 6, as shown in FIG. 5. The height-adjusting frame 7 is vertically movable to be adjusted to a proper height corresponding to the height of a passenger A, and is locked at a given position by a locking cylinder 15 to be described later. A body safety support mechanism 16 is built into the height-adjusting frame 7 to support the standing passenger A. The body safety support mechanism 16 comprises a pair of opening/closing locking type shoulder holders 17 for supporting the shoulders of the passenger A, a back support 18 for supporting the back of the passenger A, a head rest 19 for supporting the head of the passenger A, a saddle 20 for allowing the passenger A to stand thereastride, and a pivotal abdomen support 21 of a locking type which supports the abdomen of the passenger A when it is moved upward and which releases the abdomen when it is pivoted downward.

Figure 2:
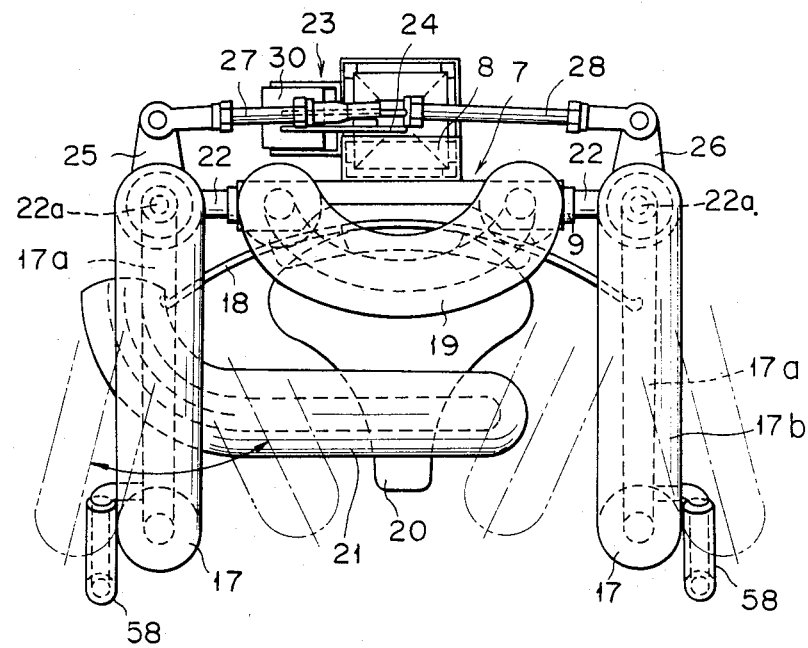
FIG. 2 is a plan view showing the detailed structure of the standing position support apparatus shown in FIG. 1.
Figure 3:
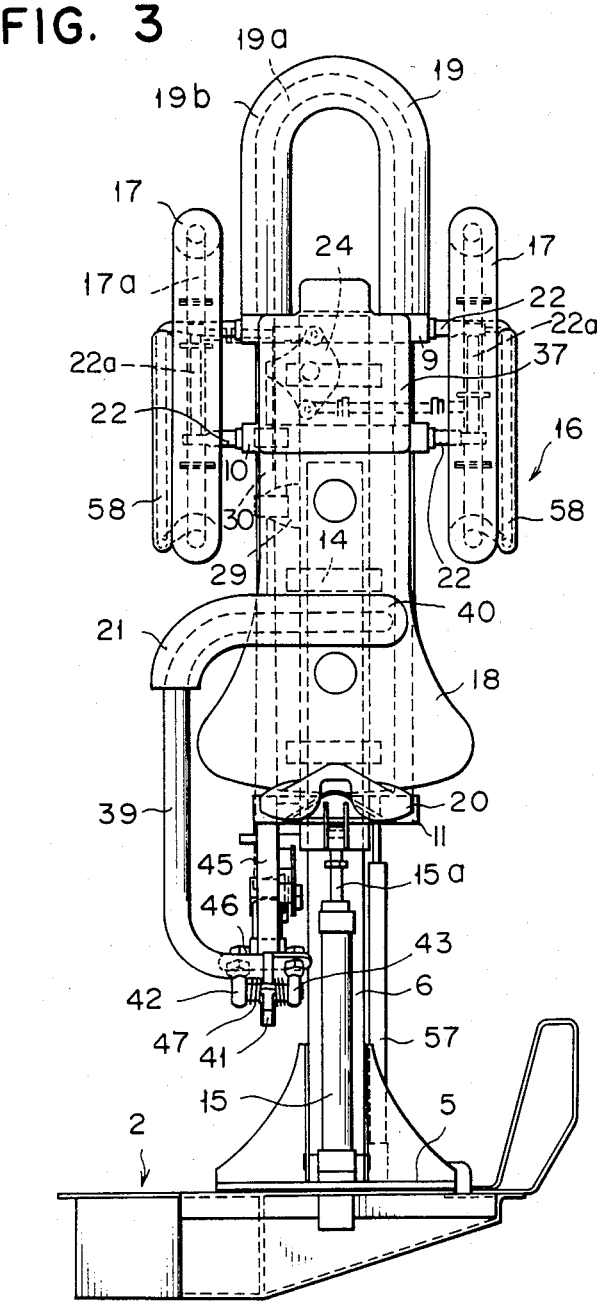
FIG. 3 is a front view of the standing position support apparatus shown in FIG. 1.
Figure 8:
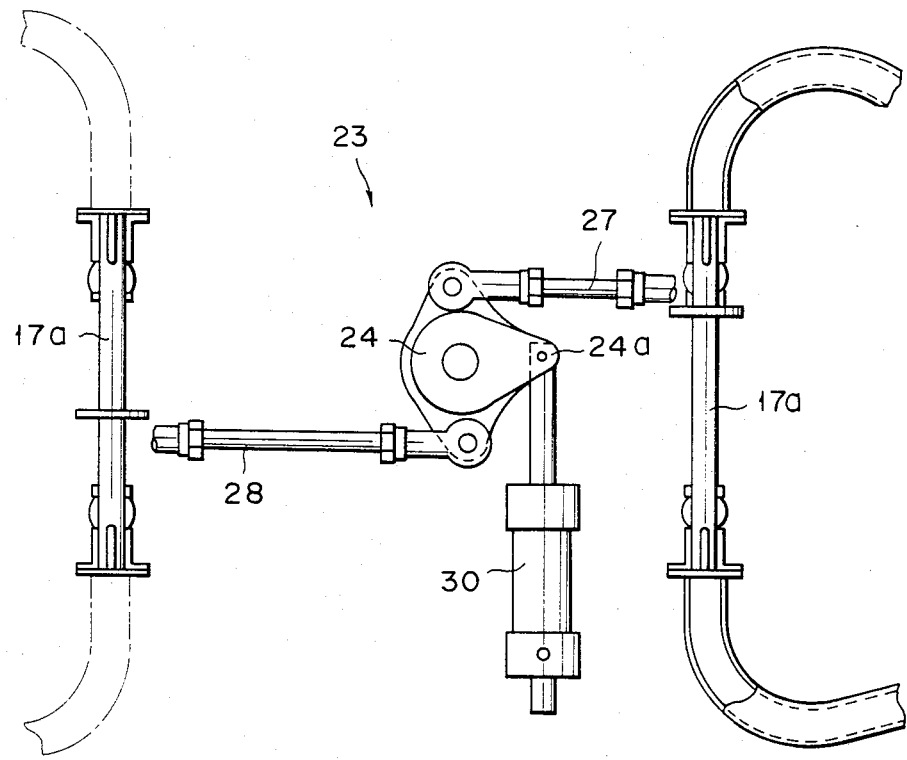
FIG. 8 is a view for explaining an opening/closing link mechanism, of right and left shoulder holders.
Figure 9:
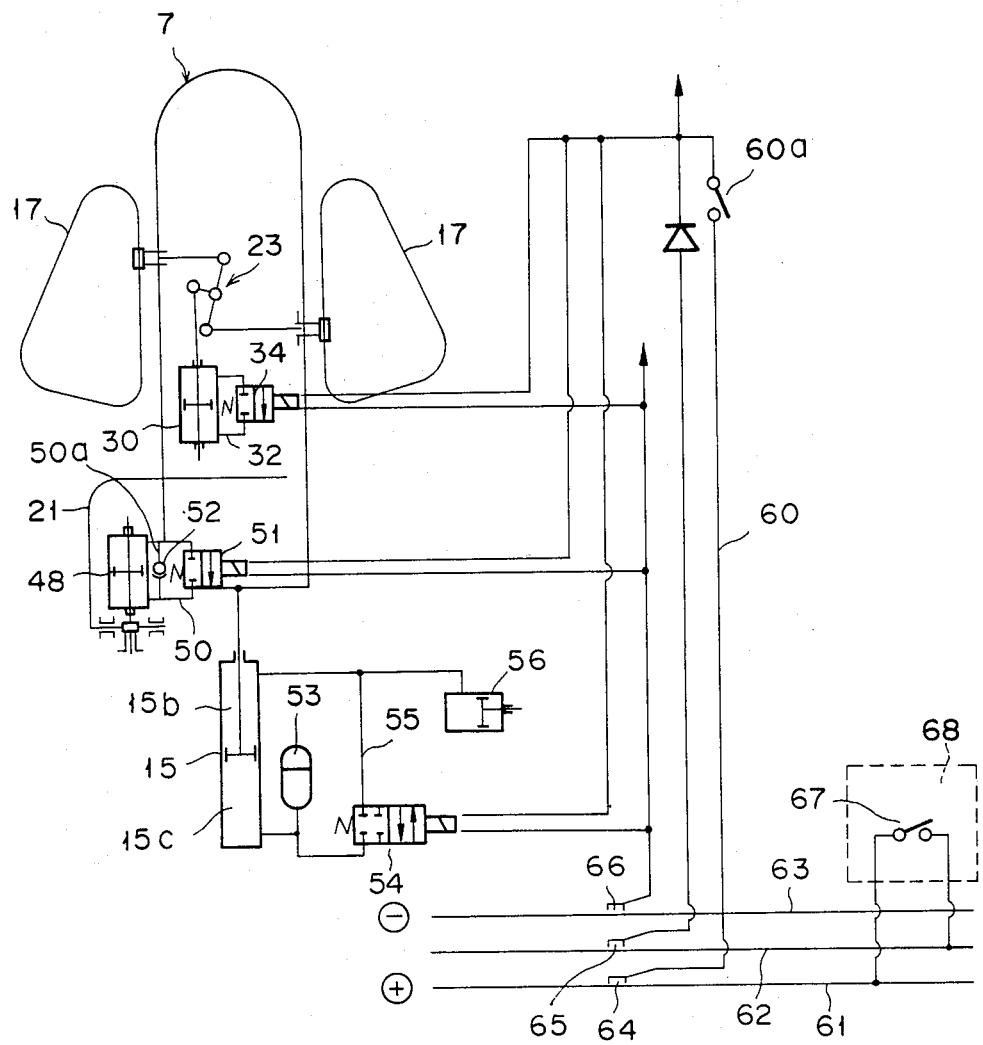
FIG. 9 is a circuit diagram of hydraulic piping and electrical wiring.

Each shoulder holder 17 comprises a triangular frame 17a and a cushion 17b which covers the triangular frame 17a. The inner angle at the upper portion of the shoulder holder 17 is 25°; the inner angle at the front lower portion thereof is 80°; and the inner angle at the rear lower portion thereof is 75°. The rear vertical portions of the frames 17a of the pair of shoulder holders 17 are respectively supported by through a vertical shaft 22a a pair of bearings 22 extending from the horizontal frame members 9 and 10 of the height-adjusting frame 7. The shoulder holders 17, which are parallel to each other and are perpendicular to the height-adjusting frame 7, may be pivoted inward by 25° and outward by 15° (a total of 40°). The opening/closing (pivotal) movement of the right and left shoulder holders 17 interlocks with a link mechanism 23 located at the upper notched portion of the height-adjusting frame 7. The link mechanism 23 comprises a link pivot plate 24 pivotally supported at the upper end notched rear plate of the height-adjusting frame 7, pivot levers 25 and 26 respectively extending backward from the rear vertical portions of the frames 17a as shown in FIG. 2, and a pair of link arms 27 and 28 for respectively pivotally connecting the pivot lever 25 of the left shoulder holder 17 to the upper portion of the link pivot plate 24 and connecting the pivot lever 26 of the right shoulder holder 17 to the lower portion of the link pivot plate 24. The piston rod end of a locking cylinder 30 supported by a pin on an upper left bracket 29 (FIGS. 3 and 6) of the height-adjusting frame 7 is pivotal about a projection 24a of the link pivot plate 24 (FIGS. 2 and 8). The locking cylinder 30 comprises two cylinder chambers which are partitioned by a piston and which communicate with each other by means of hydraulic piping 32. A solenoid-controlled valve 34 is mounted in the hydraulic piping 32 to open or close the piping 32, as shown in FIG. 9. When the solenoid controlled valve 34 is OFF, causing the oil to stop communicating between the cylinder chambers, the locked state is obtained, so that the right and left shoulder holders 17 are locked in the passenger holding positions.

The back support 18 comprises an arcuate back and hip support plate (made of a reinforced plastic), as shown in FIG. 5, which is mounted at the front side of the height-adjusting frame 7 through the horizontal frame members 9 and 10 and auxiliary intermediate horizontal members 35 and 36. A head pad 37 for children is mounted at the upper portion of the back support 18. The head rest 19 comprises a frame 19a which is welded to the upper horizontal frame member 9 of the height adjusting frame 7, and which is arcuate and extends upward to have an inverted U-shape, and a cushion 19b such as a thick urethane rubber cushion which covers the frame 19a. The saddle 20, located below the height-adjusting frame 7, is mounted on a bracket 38 extending forward from the lower end of the height-adjusting frame 7. The passenger A stands astride the saddle 20 like a bicycle saddle. The abdominal support 21 restrains the lower torso of the passenger so as not to allow him any forward movement. The abdominal support 21 comprises an inverted L-shaped pivot arm 39, and a cushion 40 such as a thick urethane rubber cushion which covers the periphery of the portion which contacts the abdomen. A pivot lever 41 fixed at the lower end of the pivot arm 39 is supported by a shaft 44 supported by bearings 42 and 43. The pivot arm 39 is then pivoted about the shaft 44 by a predetermined angle $\alpha$ as shown in FIG. 4 (equal to 55° in this embodiment). The bearings 42 and 43 are secured by bolts to a lower end plate 46 of a fixing member 45 which is made of a prism-shaped pipe and which extends obliquely from the lower side surface of the height-adjusting frame 7, as shown in FIGS. 5 and 7. Reference numeral 47 denotes a spring for urging the abdominal support 21 upward to support the abdomen of the passenger A. The spring 47 comprises a coil spring wound around the shaft 44 and having its one end secured to the lower end plate 46 and the other end secured to the pivot lever 41 (see FIG. 3). Reference numeral 48 denotes a hydraulic locking cylinder for locking the abdominal support 21 against the abdomen of the passenger A. The cylinder end is pivotally supported by a pin on a bracket 49 of the fixing member 45, and the piston rod end of the cylinder is pivotally supported by a pin at the distal end of the arm pivot pin 41, as shown in FIG. 5. The locking cylinder 48 causes the two partitioned cylinder chambers therein to communicate with each other by means of hydraulic piping 50. A solenoid-controlled valve 51 is mounted within the hydraulic piping 50. When the solenoid-controlled valve 51 is closed, the piston rod of the locking cylinder 48 is movable only in the elongating direction. For this purpose, a check valve 52 is mounted in a bypass pipe 50a for allowing an oil flow so as to pivot the abdominal support 21 only in the direction toward the abdomen of the passenger A (FIG. 9).

The locking cylinder 15 of the height-adjusting frame 7 will be described. When the height-adjusting frame 7 is vertically moved, a piston rod 15a of the locking cylinder 15 follows the movement of the height-adjusting frame 7. When the height adjusting frame 7 is adjusted to a proper position, the locking cylinder 15 locks the height adjusting frame 7 at the proper position corresponding to the height of the passenger A. The cylinder end is pivotally supported by a pin on the bracket of the base 5, and the upper end of the piston rod 15a is pivotally supported near the proximal end of the saddle bracket 38 of the height-adjusting frame 7.

In the locking cylinder 15 for locking the height-adjusting frame 7, two partitioned cylinder chambers 15b and 15c communicate with each other by means of a hydraulic piping 55 having an accumulator 53 and a solenoid-controlled valve 54, as shown in FIG. 9. A reservoir tank 56 is connected between the solenoid-controlled valve 54 and the upper cylinder chamber 15b. When the solenoid-controlled valve 54 is opened, the cylinder chambers 15b and 15c communicate with each other, so that oil in one cylinder chamber flows into the other cylinder chamber. Therefore, the passenger A can manually adjust the height of the height-adjusting frame 7. However, when the solenoid-controlled valve 54 is closed, oil may not flow between the cylinder chambers 15b and 15c. Thus, the height-adjusting frame 7 is locked at a proper position. In this locked position, when an overload such as an excessive gravity (G) force due to an increase in acceleration accompanied by a nose dive of the main body 2 is applied to the locking cylinder 15 through the body safety support mechanism 16 and the height-adjusting frame 7, the piston rod 15a which does not move in normal conditions moves downward when oil in the lower cylinder chamber 15c is supplied to the accumulator 53, whereby an overload due to the excessive gravity force can be weakened, and the piston rod 15a is lowered to reduce the impact to the body. At this time, oil from the reservoir tank 56 is supplied to the upper cylinder chamber 15b. When the excessive gravity (G) force is removed, the piston rod 15a returns to its previous position by means of the accumulator 53, and the excessive oil in the upper cylinder chamber 15b returns to the reservoir tank 56. Thus, the height-adjusting frame 7 maintains a predetermined height and is locked in the same manner as in normal operation.

An operation switch 60a electrically connected through three trolley lines 61 to 63 and power collecting brushes 64 to 66 respectively to an electrical circuit 60 which is arranged on the main body 2, and an operation switch 67 in a control room 68 electrically connected to the trolley lines 61 and 62, are turned on/off to open/close the solenoid-controlled valves 54, 34 and 51 which respectively drive the locking cylinder 15 for adjusting the height adjusting frame 7, the locking cylinder 30 of the shoulder holders 17, and the locking cylinder 48 of the abdominal support 21, as shown in FIG. 9. Reference numeral 57 throughout FIGS. 3 to 5 denotes a gas spring which is used together with the locking cylinder 15 for adjusting the height-adjusting frame 7. The lower end portion of the gas spring 57 is supported by a pin on the bracket of the base 5, and the upper end of the piston rod is pivotally supported by a pin on the lower bracket of the cylinder 8 of the height-adjusting frame 7 so as to substantially cancel out the overall weight of the height-adjusting frame 7 and the body safety support mechanism 16. Therefore, when the locking cylinder 15 is free, the passenger A can readily manually adjust the height-adjusting frame 7 bearing the body safety support mechanism 16.

Reference numeral 58 throughout FIGS. 2 to 5 denotes a pair of grip handles which are respectively disposed on the right and left shoulder holders 17, so that the passenger A can grasp the grip handles 58 for further safety.

During operation of the standing loop coaster having a plurality of main bodies 2, passengers are respectively supported on the standing position support apparatuses 4 on the main bodies 2. The passenger A lowers the abdominal support 21 to stand astride the saddle 20. The passenger A then manually adjusts the height-adjusting frame 7 to a proper height so as to match the saddle 20 with his crotch. Thus, the passenger stands astride the saddle 20, and rests the back of his body and the back of his head respectively on the back support 18 and the head rest 19. He then passes his arms through the shoulder holders 17 and moves the shoulder holders 17 toward himself such that the should holders contact his shoulders and sides. In this condition, the abdominal support 21 is urged against the lower torso from the front of the body by the urging force of the spring (FIG. 5). When all the passengers are supported by a standing position support apparatus in the manner as described above, the operator turns on the operation switches 60a and 67 to close the solenoid-controlled valves 54, 34 and 51 of the locking cylinders 15, 30 and 48, respectively. Thus, the locking cylinder 15 of the height-adjusting frame 7 is locked, and the body safety support mechanism 16 is maintained at the height set by the passenger A. Furthermore, the right and left shoulder holders 17 are secured in a position where they contact the passenger's shoulders and sides. The abdominal support 21 is also locked by the locking cylinder 48. The abdominal support 21 is urged pivotally toward the abdomen by the check valve 52, so that the abdominal support 21 may not be released from the abdomen of the passenger A. Thus, the passenger stands astride the saddle 20 and may not fall down. Furthermore, the passenger's vertical movement is also prohibited. In order to lessen mental anxiety, the passenger can grip the grasp handles 58.

After confirming the safety of the passengers, the operator starts the coaster so as to roll the main bodies 2 along the track. When the main body 2 rolls up an ascending track, the back of the body and the back of the head rest on the back support 18 and the head rest 19, respectively, thus maintaining a safe posture without danger. When the main body 2 rolls along a curved track, the passenger A stands astride the saddle 20 and his lower torso is restrained by the abdominal support 21. Furthermore, since the shoulder holders 17 hold his shoulders and sides, the body portion above the hips is supported and protected. When the main body 2 rolls down a descending track immediately after the main body 2 is started, the abdominal support 21, the right and left shoulder holders 17 and the grip handles 58 assure the safety of the passenger. When the main body 2 nose-dives on the descending track, a gravity (G) force corresponding to a load of a few multiples of the passenger's weight is experienced. If no safeguard is provided, an overload is applied to the legs of the passenger, resulting in an undesirable accident. However, since the passenger stands astride the saddle 20, the overload is applied both to the legs and to the hip portion, the latter of which is the strongest portion of the body. Furthermore, since the shoulders are supported by the right and left shoulder holders 17, the overload is also lessened by being received at the sides of the body. Thus, the overload is distributed over various parts of the body. Further, at this time, the locking cylinder 15 for adjusting the height-adjusting frame 7 functions as a damper against the overload, thus decreasing the overload. Although the passenger is slightly vertically moved, he can maintain the upright posture without danger and return safely to the initial truck platform after large turns and somersaults are performed. During the motion of the main body 2, when an unexpectedly large gravity (G) force is applied to the passenger or if the passenger has fainted, the passenger tends to bend his knees. However, since the belly support 21 holds the belly, the hips may not be removed from the saddle 20. Further, since the shoulders are supported by the shoulder holders 17, the upright posture of the passenger is maintained, thus guaranteeing the safety of the passenger and eliminating danger.

In any state of motion, the passenger is kept safely in the standing posture, his center of gravity is high, and his eye level is also high. Further, since neither the supports nor the frame surround the passenger who is standing on the main body 2, a wide view is guaranteed on all sides of the passenger. Unlike the conventional somersault coaster where the passenger sits therein, more thrilling excitement can be obtained when the main body 2 nose-dives and somersaults. In addition to this, since the body safety support mechanism 16 is slightly moved downward by the damping function of the locking cylinder 15 for adjusting the height-adjusting frame 7, the passenger may slightly bend his knees, thus providing further thrills.

Figure 10:
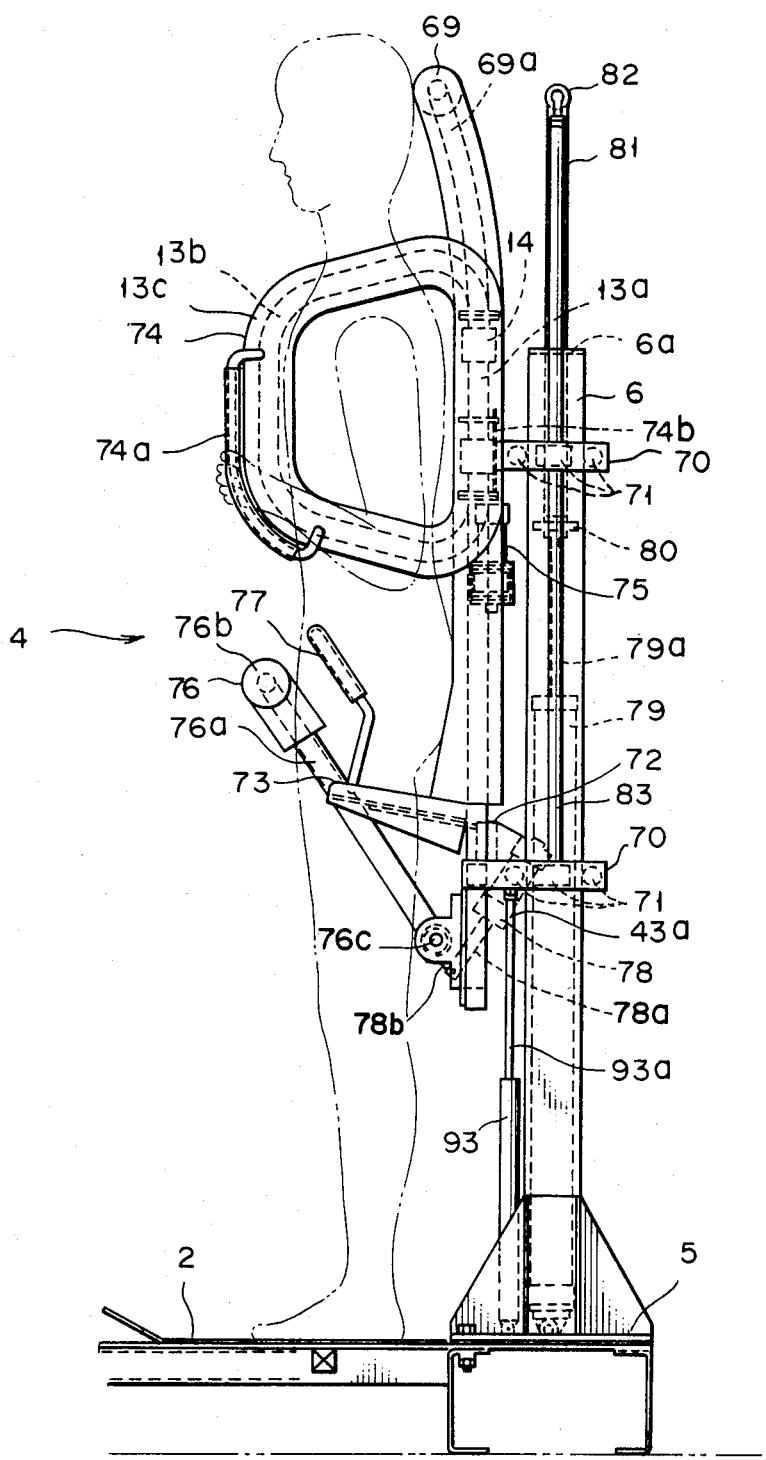
FIG. 10 is a side view of a standing loop coaster according to a second embodiment of the present invention.

FIG. 10 shows a standing support apparatus according to a second embodiment of the present invention. A column 6 made of a prism-shaped hollow steel pipe is disposed upright on the upper surface of a vehicle main body 2 through a base 5. The column 6 has a cap 6a with a hole at the upper end thereof. A body safety support mechanism for safely holding the back, shoulder and hip portions of the substantially standing passenger is mounted on the front side of the column 6.

A vertically elongated back support 69 of an inverted U-shape is used for the standing support and is disposed as the body safety support mechanism on the front side of the column. Support frames 70 which surround the column 6 respectively extend backward from the upper and lower portions of the left and right straight portions of a frame 69a of the back support 69. A set of four guide rollers 71 at four sides of the column 6 are disposed inside each support frame 70. The back support 69 is vertically movable along the column 6 at two portions of the column 6. The back support is supported at a desired height by the height-adjusting mechanism which weakens an overload due to gravity (G).

A saddle 73 which extends forward from a bracket 72 fixed at lower projections of the right and left vertical straight portions of the framework 69a is mounted at the lower portion of the back support 69.

Shoulder holders 74 are respectively disposed at the left and right portions of the back support 69 which are positioned slightly above the intermediate portion of the back support 69 in order to support the vicinities of the shoulders of the passenger. The shoulder holders 74 pivot by a link mechanism 74b disposed between the right and left vertical straight portions of the frames 69a of the back support 69. The shoulder holders 74 are connected to a piston rod 75d of a locking cylinder 75 mounted at the rear surface of the back support 69. The pivotal movement of the shoulder holders 74 is prevented by the switching operation of the valve in a hydraulic circuit to be described later. As a result, the shoulder holders 74 are locked in a desired closed position.

Further, an abdominal support 76 which is supported at the lower end of the back support 69 presses against the lower torso of the passenger from the front of the body, so that the hip portion of the passenger is kept stable and may not slip off the saddle 73. The abdominal support 76 comprises a pivot arm 76a made of an inverted L-shaped steel pipe, and a cushion 76b such as a thick soft rubber portion which covers the body contact portion of the pivot arm 76a. An operation handle 77 is disposed at the intermediate portion of the pivot arm 76a to allow the passenger to pull up the abdominal support 76. A rotating shaft 76c of the abdominal support 76 is, through a pivot lever 78b, connected to a piston rod 78a of a locking cylinder 78 mounted at the rear surface of a bracket secured to downwardly extending right and left portions of the back support 69. The locking cylinder 78 is actuated by the switching operation of the valve in the hydraulic circuit to be described later so as to lock the pivotal movement of the abdominal support 76.

Figure 11:
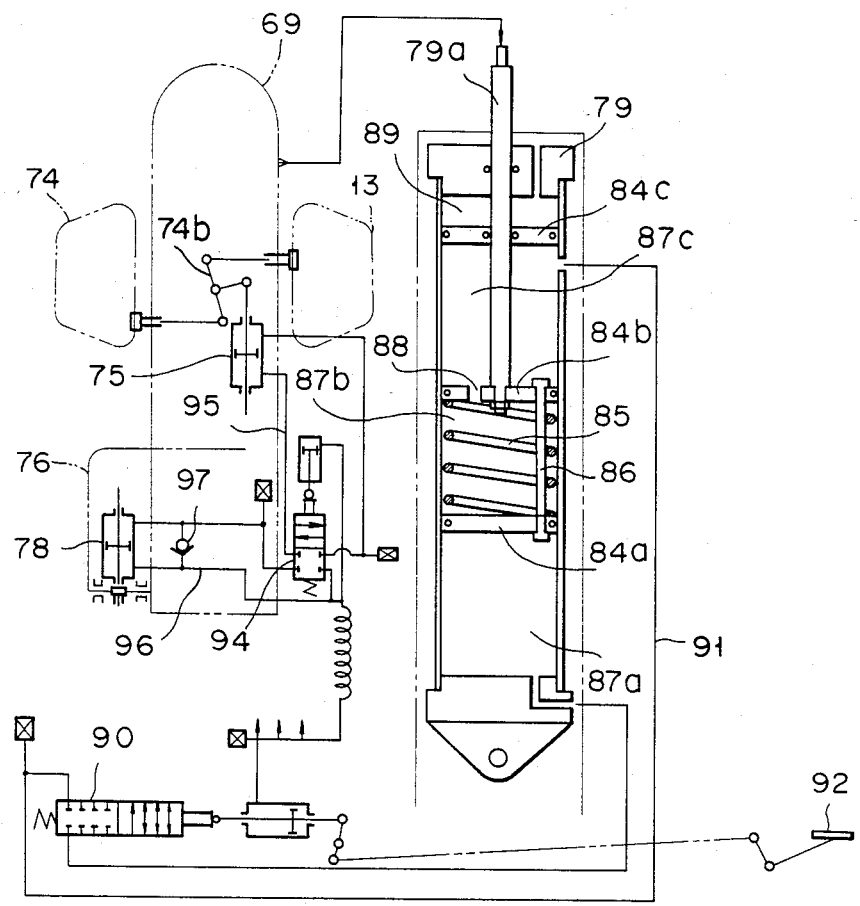
FIG. 11 is a circuit diagram of hydraulic piping and electrical wiring.

A height-adjusting mechanism which also functions to damp the overload by gravity (G) allows vertical adjustment of the height with respect to the body safety support mechanism. The height-adjusting mechanism comprises a built-in spring locking cylinder 79 which extends on the base 5 and is inserted in the column 6, a lifting rod 81 which is connected to the upper end of a piston rod 79a of the locking cylinder 79 through a guide plate 80 vertically movable in the column 6 and which extends upward through the cap 6a with a hole, a T-shaped suspension bar 82 mounted at the upper end of the lifting rod 81, and a pair of left and right rods 83 which are respectively connected to the upper and lower support frames 70 extending from the back support 69 and which respectively extend downward from the two ends of the suspension bar 82. The locking cylinder 79 has first, second and third pistons 84a, 84b and 84c from its bottom, as shown in FIG. 11. The piston rod 79a extends upward from the second piston 84b tightly through the third piston 84c. A damping spring 85 is sandwiched between the first and second pistons 84a and 84b. The first and second pistons 84a and 84b are movably connected by means of a guide rod 86 so that they may not be spaced apart from each other more than a predetermined distance. A first oil chamber 87a is disposed under the first piston 84a. A second oil chamber 87b is disposed between the first and second pistons 84a and 84b. A third oil chamber 87c is disposed between the second and third pistons 84b and 84c and communicates with the second oil chamber 87b through an orifice 88 formed in the second piston 84b. An air chamber 89 which is open to the atmosphere is disposed above the third piston 84c. The first and third oil chambers 87a and 87c communicate with each other through a hydraulic circuit 91 having a valve 90. When a foot pedal 92 is pressed to open the valve 90, the lifting movement of the first and second pistons 84a and 84b by the piston rod 79a is allowed, so that the passenger can adjust the body safety support mechanism to a desired height with respect to the column 6. When the foot pedal 92 is released to close the valve 90, oil does not flow between the first and third oil chambers 87a and 87c. Thus, at least the movement of the first piston 84a is completely stopped. The second piston 84b and the piston rod 79a which are supported on the first piston 84a through the damping spring 85 are kept stationary in the normal load (load corresponding to the sum of the passenger's weight and the overall weight of the body safety support mechanism 7), so that the body safety support mechanism can be kept at the desired height. When a force of gravity (G) corresponding to an overload which is a few multiples of the passenger's weight is applied to the piston rod 79a through the passenger and the body safety support mechanism (due to an increase in acceleration in the nose dive), the second piston 84b moves downward relative to the first piston 84a against the urging force of the damping spring 85 and the resistance to the oil flow from the second oil chamber 87b to the third oil chamber 87c through the orifice 88. Thus, the overload is decreased. At this time, the descending movement of the piston rod 79a cannot be performed due to the reaction of the piston rod unless the outflow of the oil from the second and third oil chambers 87b and 87c corresponds to a volume obtained by multiplying the descending distance by the sectional area of the piston rod. However, due to the reaction of the rod, the third piston 84c above the third oil chamber 87c is moved upward by causing the air in the air chamber 89 to escape to the atmosphere, thus allowing the descending movement of the piston rod 79a.

Reference numeral 93 shown in FIG. 10 denotes a gas spring extending from the base 5 at the front surface of the column 6 to be used together with the height adjusting mechanism. The upper end of a piston rod 93a of the gas spring 93 is connected to the lower support frame 70 extending from the back support 69 and urges the lower support frame 70 upward. Thus, the overall weight of the body safety support mechanism is cancelled, so that the passenger can easily adjust the body safety support mechanism.

The locking cylinder 75 of the right and left shoulder holders 74 and the locking cylinder 78 having check valve of the abdominal support 76 are operated by pressing or releasing the foot pedal 92 which closes or opens a valve 94 of hydraulic circuits 95 and 96, as shown in FIG. 11. A check valve 97 is disposed in the hydraulic circuit 96 of the abdominal support 76 in parallel with the valve 94. Even in the locked state, the abdominal support 76 can be moved in the direction toward the passenger's body, but cannot be moved in the direction opposite to his body.

During operation, when the standing loop coaster having a plurality of main bodies 2 is stopped at the platform, the passengers get on the standing position support apparatuses 4. After the operator presses the foot pedal 92, the passenger A pulls up or pushes down the body safety support mechanism to obtain a desired height corresponding to his height so as to match the saddle 73 with his crotch. Thus, the passenger A can stand astride the saddle 73 and rest the back of his head and back of his body on the back support 69. He inserts his right and left arms into the right and left shoulder holders 74 respectively and pulls the shoulder holders 74 toward himself so as to bring the shoulder holders 74 into contact with his shoulders and sides. The passenger then holds the handle 77 to pull up the abdominal support 76 which is then brought into contact with his abdomen. When all the passengers are supported on the standing position support apparatuses, the operator releases the foot pedal 92 to close the valves 90 and 94 of the hydraulic circuits 91, 95 and 96, respectively. The cylinder 79 of the height-adjusting mechanism is locked to safely support the passenger on the column 6. Further, the right and left shoulder holders 74 are brought into contact with his shoulders by the locking cylinder 75 through the link mechanism 74b and sides and are locked without sideward movement. The abdominal support 76 is also locked by the locking cylinder 78, but is allowed to move toward the passenger's body. Thus, no space is formed between the abdominal support 76 and the abdomen. As a result, the passenger A stands astride the saddle 73 and may not fall in any direction. Furthermore, his vertical movement is regulated. The passenger can grasp grip handles 74a to lessen anxiety.

The operator starts the standing loop coaster after the safety of the passengers is confirmed. When the main body 2 rolls up an ascending track, the back of the body and the back of the head rest on the back support 69, thus maintaining the safety posture without danger. When the main body 2 rolls along a curve, the passenger A stands astride the saddle 73 and his belly is restrained by the abdominal support 76. Furthermore, since the shoulder holders 74 hold his shoulders and sides, the body portion above the hips is supported and protected. When the main body 2 rolls down a descending track immediately after the main body 2 is started, the abdominal support 76, the right and left shoulder holders 74 and the grip handles 74a assure the safety of the passenger. When the main body 2 nose-dives on the descending track, a gravity (G) force corresponding to a load of a few multiples of the passenger's weight is experienced. If no safeguard is provided, an overload is applied to the legs of the passenger, resulting in an undesirable accident. However, since the passenger stands astride the saddle 73, the overload is applied both to the legs and the hip portion, the latter of which is the strongest portion of the body. Furthermore, since the shoulders are supported by the right and left shoulder holders 74, the overload is also weakened by being received at the sides of the body. Thus, the overload is spread-out and distributed over various parts of the body. Further, at this time, the piston rod 79a of the cylinder 79 of the height-adjusting mechanism is lowered against the urging force of the damping spring 85, thus decreasing the overload. Although the passenger is moved slightly in the vertical direction, he can maintain an upright posture without danger and return safely to the truck platform after large turns and somersaults are performed. During the motion of the main body 2, when an unexpectedly large gravity (G) force is applied to the passenger or if the passenger has fainted, the passenger tends to bend his knees. However, since the abdominal support 76 holds the abdomen, the hips may not be removed from the saddle 73. Further, since the shoulders are supported by the shoulder holders 74, the upright posture of the passenger is maintained, thus guaranteeing the safety of the passenger and eliminating danger.

Figure 12:
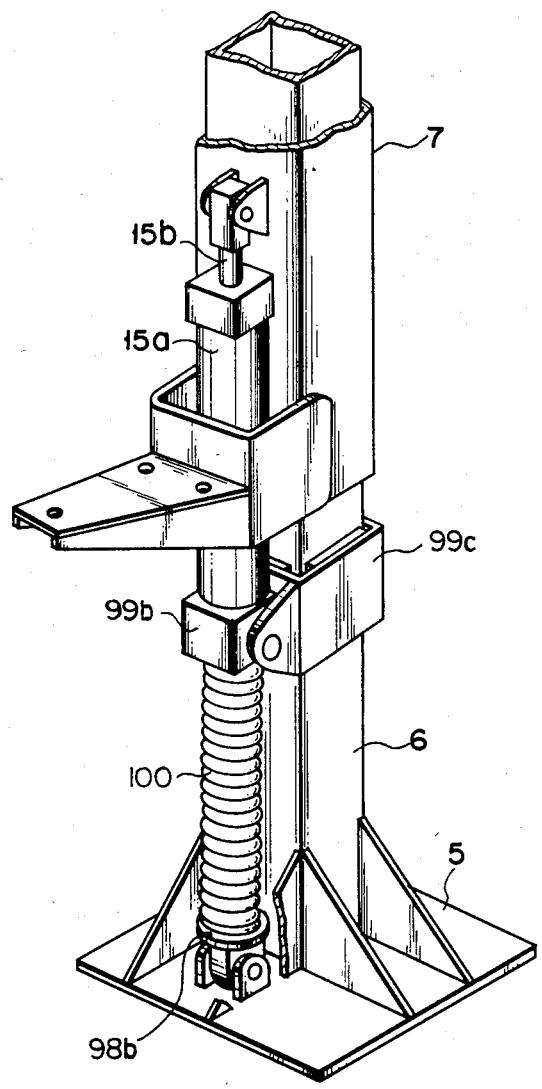
FIG. 12 is a perspective view showing a modification of a height-adjusting mechanism of the standing position support apparatus shown in FIG. 10.
Figure 13:
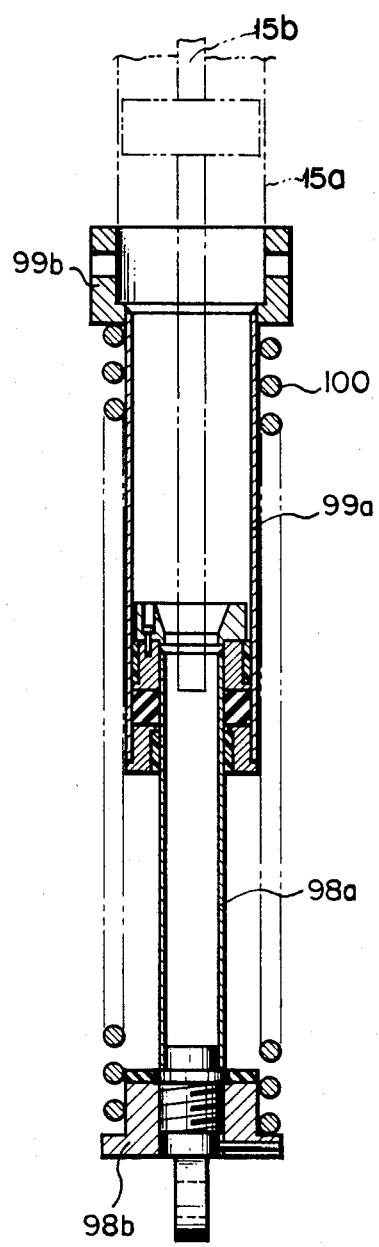
FIG. 13 is a sectional view showing the main part of the height-adjusting mechanism shown in FIG. 12.

In the height-adjusting mechanism of the above embodiment, the accumulator 53 is arranged in the piping 55 of the hydraulic locking cylinder 15 for adjusting the height of the lift, as shown in FIG. 9, or the locking cylinder 79 having a piston rod with the damping spring 85 and the air chamber 89 formed in the cylinder as shown in FIG. 11 is used. Thus, the height-adjusting mechanism also functions as a damper. Alternatively, as shown in FIGS. 12 and 13, the height-adjusting frame (as indicated by reference numeral 7 in FIG. 4) may be supported and locked at a predetermined position by a locking cylinder to be described later through a spring to provide a damping function. Reference numeral 98a denotes an inner cylinder. The lower end of the inner cylinder 98a supported on the upper surface of the base 5 on which the column 6 extends. Reference numeral 99a denotes an outer cylinder which guides the spring and which is fitted around the inner cylinder 98a from the top to be vertically movable. A compression coil spring 100 is hooked between a spring seat 98b disposed at the lower end of the inner cylinder 98a and a bracket 99b secured to the upper end of the outer cylinder 99a. The bracket 99b is supported by a lift 99c which is slidable along the column 6. The lower end of a locking cylinder 15a for locking the position of the height-adjusting frame 7 is securely supported on the bracket 99b. The locking cylinder 15a comprises a hydraulic cylinder having a rod 15b extending through its two ends. The locking cylinder 15a is divided into two cylinder chambers by the piston. The height-adjusting frame 7 is connected to the upper end of the piston rod 15b through a bracket. The height-adjusting frame 7 supported through the compression coil spring 100 and the locking cylinder 15a is constantly urged upward by the urging force of the spring 100. The passenger adjusts the height of the shoulder holders and the saddle which are disposed at the height-adjusting frame 7 in accordance with the height of the passenger. When the locking cylinder 15a is locked, the shoulder holders and the saddle are locked at the desired height. Thus, the passenger can be safely held standing on the coaster while it is rolling along the track. When an overload is applied to the passenger during a nose dive or the like, the downward overload is cancelled by the damping mechanism, that is, the urging force of the spring 100. Thus, the safety of the passenger is assured.

Figure 16:
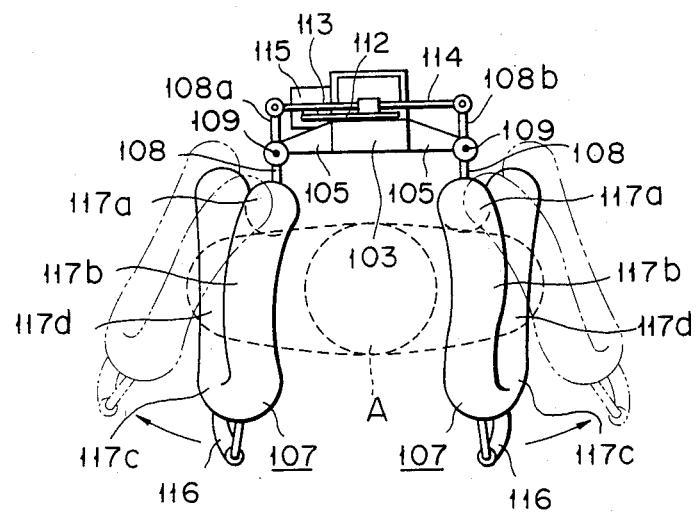
FIG. 16 is a plan view of the standing position support apparatus shown in FIG. 14.
Figure 17:
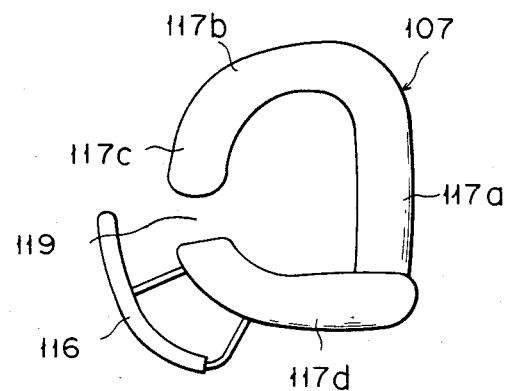
FIG. 17 is a side view of a modification of the right and left shoulder holders.

A standing position support apparatus according to a third embodiment of the present invention will be described with reference to FIGS. 14 to 17. Referring to FIG. 14, reference numeral 101 denotes a main body of an amusement vehicle which rolls and orbits along the track. A vertical column 102 having a square cross-section is disposed in the standing support position of the main body 101. Reference numeral 103 is a lift which is vertically movable in accordance with the height of the passenger A. The lift 103 comprises a cylindrical body having a square cross-section and is slidably inserted in the column 102. The vertical movement and the locking operation of the lift 103 are performed by a hydraulic locking cylinder 104 disposed between a bracket 103a and a bracket 102a. The locking operation is performed by closing the valve arranged in the hydraulic circuit of the locking cylinder 104. A pair of horizontal brackets 105 which are spaced apart from each other are disposed at the two sides of the upper portion of the lift 103. Reference numeral 107 denotes right and left shoulder holders which can be adjusted in accordance with the width of the body (particularly chest) of the passenger A. The shoulder holders 107 comprise frames 107a of annular members each having a free end deviating from the plane defined by most of the length of the annular member, and a back support frame portion 117a which abuts against the two sides of the back of the body, a shoulder support frame portion 117b which abuts against the shoulders, a chest support frame portion 117c which supports the two sides of the chest, and a side support frame portion 117d whose distal ends are brought into contact with the two sides of the body of the passenger A and extend outwardly of the lower end of the back support frame portion 117a, as shown in FIGS. 14 to 16. The frame 107a of the shoulder holder 107 is covered with a cushion 107b made of a thick soft rubber portion. Upper and lower support arms 108, extending backward from the back support frame portions 117a of the right or left shoulder holder 107, are pivoted by shafts 109 which are supported by the pair of brackets 105 of the lift 103, so that the right and left shoulder holders 107 are pivotal about the shafts 109. Since the shafts 109 are respectively located behind the back support frame portions 117a of the right and left shoulder holders 107 as shown in FIG. 16, the distance between the right and left back support frame portions 117a can be adjusted in accordance with the width of the body of the passenger A such as an adult or child. Reference numeral 110 denotes a link mechanism which comprises a pivot plate 112 supported at its center by a horizontal shaft 111 at the center of the upper notched portion of the lift 103, link levers 113 and 114 which are vertically symmetrical about the shaft 111 and are respectively disposed at a position between a pivot lever 108a as the extended portion of the support arm and the lower part of the pivot plate 112 and a position between a pivot lever 108b as the extended portion of the support arm and the upper part of the pivot plate 112, and a locking cylinder 115 having an end supported by a pin at a bracket 103b and having a piston rod 115a whose end is supported by a pin at the horizontal extending portion of the pivot plate 112. When the locking cylinder 115 is released by opening the valve arranged in the hydraulic circuit, the passenger A can easily push the shoulder holders 107 outward or inward, so that the shoulder holders 107 are interlockingly moved. When the shoulder holders 107 are brought into contact with the shoulders and sides of the body and thereafter the locking cylinder 115 is locked, the outward movement of the shoulder holders 107 is prevented. The link mechanism and the locking mechanism of the shoulder holders 107 have substantially the same configurations as those of the previous embodiment, and a detailed description thereof will be omitted. Reference numeral 116 denotes grip handles which are respectively mounted at the right and left shoulder holders 107. Reference numeral 118 denotes a fastening belt for securing the body of the passenger A to the lift 103. FIG. 17 shows a modification of the shoulder holder 107. A notch 119 is formed at a portion (through which the passenger inserts or removes his arm) of the shoulder holder 107. In this modification, the passenger A can easily insert his arms into the holders or remove his arms therefrom while the shoulder holders 107 are opened as indicated by the imaginary lines in FIG. 16. When the shoulder holders 107 are brought into contact with the shoulders and sides, the arms may not be removed therefrom. The distance between the shoulder holders 107 may be adjusted by moving them horizontally by means of the hydraulic locking cylinder.

As described above, since the pair of shoulder holders are made of annular members of a three-dimensional curved configuration with cushions for supporting the back, shoulders, chest, and sides of the body of the passenger, only the shoulder holders or only the shoulder holders and the fastening belt guarantee the safety of the passenger standing in the upright posture, thus simplifying the standing room apparatus. Further, since the lower half of the body is free, various actions can be experienced, obtaining more thrilling excitement.

Figure 18:
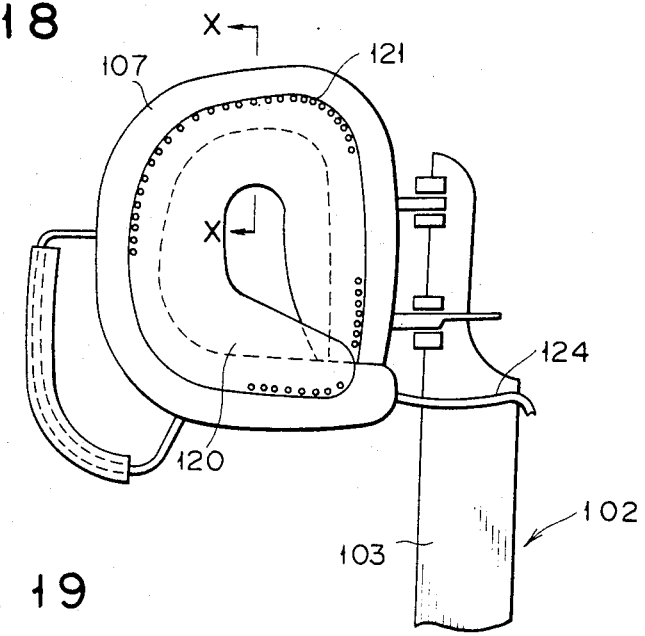
FIG. 18 is a side view of the main part of the shoulder holder, shown in FIGS. 14 to 17, to which an expandable bag is attached, according to a fourth embodiment of the present invention.
Figure 19:
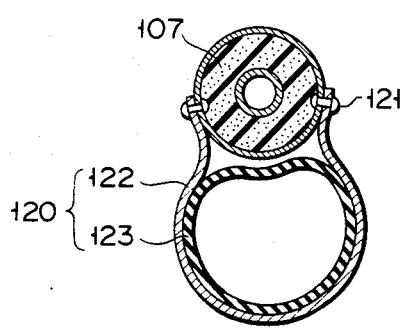
FIG. 19 is a sectional view of the shoulder holder taken along the line X—X in FIG. 18.
Figure 20:
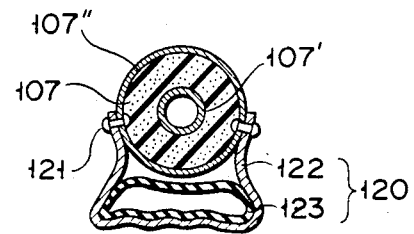
FIG. 20 is a sectional view of part of the collapsed bag corresponding to that of the bag shown in FIG. 19.
Figure 21:
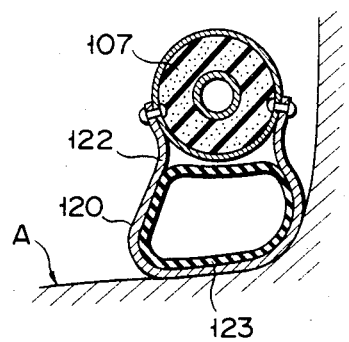
FIG. 21 shows the state where the expanded bag is in tight contact with the passenger body.
Figure 22:
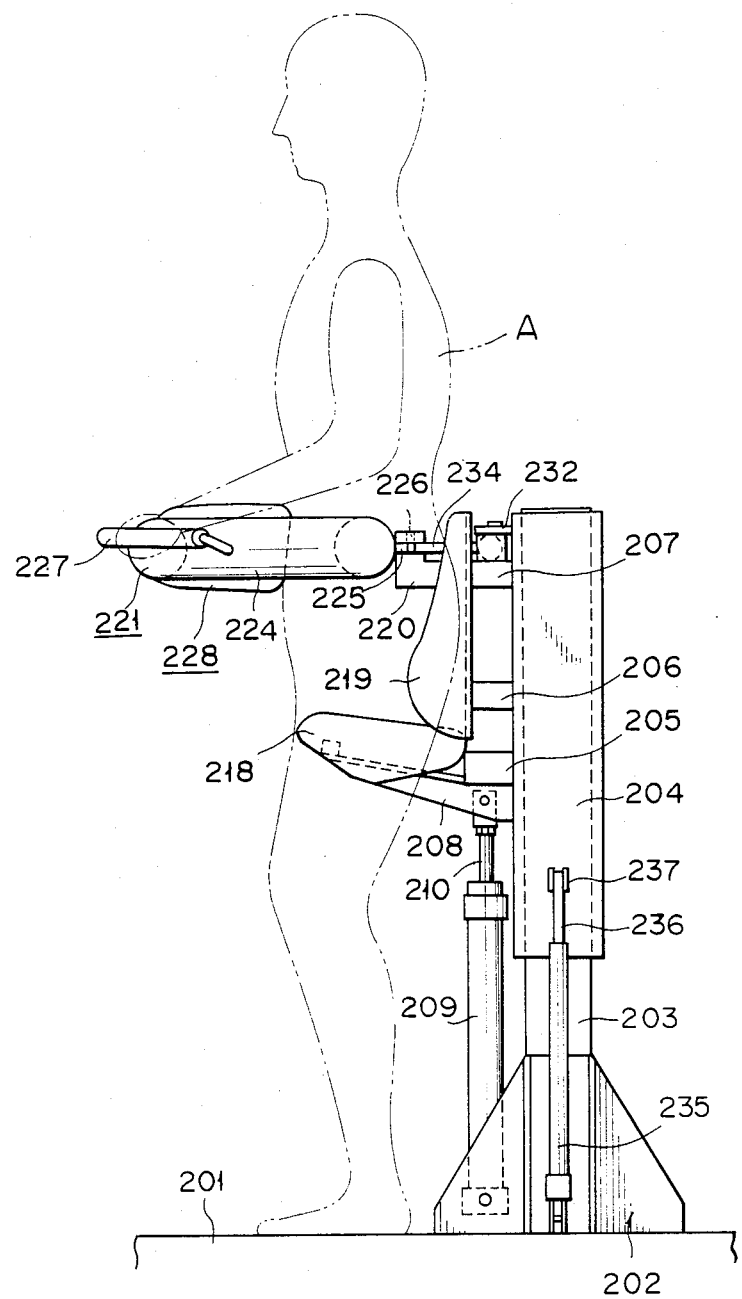
FIG. 22 shows a side view of a standing position support apparatus according to a fifth embodiment of the present invention.
Figure 23:
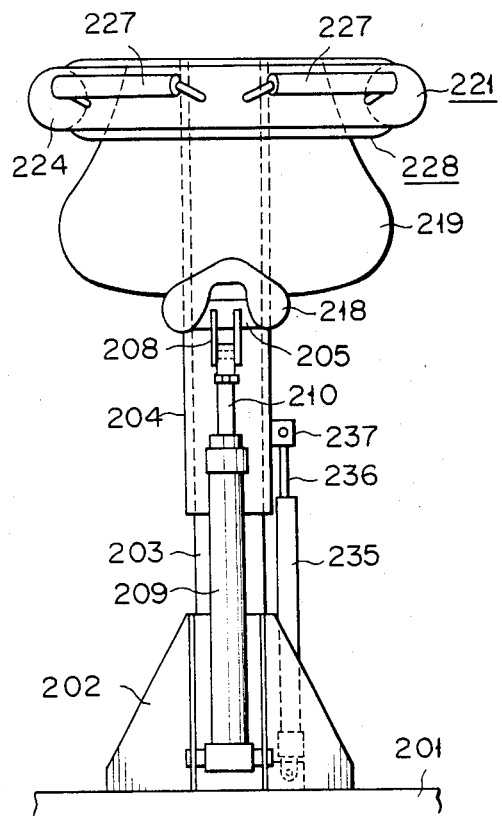
FIG. 23 is a front view thereof.

FIG. 18 shows a shoulder holder to which an expandable bag 120 is attached according to a fourth embodiment of the present invention. The expandable bag is usually shrunk, but it may be expanded by introducing air therein as needed to be brought into tight contact with the body of the passenger, assuring the safety of the passenger. As shown in FIG. 20, the expandable bag 120 is usually shrunk and is mounted inside the shoulder holder 107. When air is introduced into the expandable bag 120, the expandable bag 120 is expanded as shown in FIGS. 18, 19 and 21. The expandable bag 120 comprises an expandable outer shell 122 fixed along the inner surface of the shoulder holder 107 by a number of rivets 121 and an expandable rubber tube 123 which is fitted inside the expandable outer shell 122. After the shoulder holders are set as shown in FIG. 14, air is introduced in the rubber tubes 123 respectively through rubber hoses 124. As shown in FIG. 21, the expandable bag is expanded which is then brought into contact with a body portion (portion around the shoulder) to safely support and protect the passenger A. FIGS. 18 and 19 show the states where the arm is not inserted through the expandable bag 120 which is freely expanded.

The air is manually or electrically/mechanically introduced into the expandable bag 120 through the rubber hose 124 which is connected to an air supply source such as a foot pump (not shown).

A standing position support apparatus according to a fifth embodiment of the present invention will be described with reference to FIGS. 22 to 29.

Reference numeral 201 denotes a main body of an amusement vehicle which is moved or orbits along the track. A column 203 having a square cross section extends vertically on the upper surface of the main body 201, which corresponds to the standing support, through a bracket 202. A lift 204 is vertically slidable around the column 203. The lift 204 is made of a cylindrical body having a square cross section. Three brackets 205, 206 and 207 are spaced apart from each other at predetermined intervals and are disposed in front of the lift 204. A stay 208 which extends in a substantially horizontal direction is secured to the lowest bracket 205. One end of a hydraulic locking cylinder 209 is pivotal about the bracket 202. The hydraulic locking cylinder 209 is vertically disposed in front of the column 203. The upper end of a piston rod 210 of the hydraulic locking cylinder 209 is connected to the stay 208. The hydraulic locking cylinder 209 of this embodiment has first and second chambers 212 and 213 partitioned by a piston 211 connected to the piston rod 210, shown in FIG. 25. The first and second cylinder chambers 212 and 213 communicate with each other by means of piping 214. A solenoid controlled valve 215 is arranged in the piping 214. A reservoir tank 216 is disposed between the first cylinder chamber 212 and the solenoid-controlled valve 215. An accumulator 217 is disposed between the second cylinder chamber 213 and the solenoid-controlled valve 215. When the solenoid-controlled valve 215 is opened, the first and second cylinder chambers 212 and 213 communicate with each other and then the piston rod 210 becomes free. However, when the solenoid-controlled valve 215 is closed, the oil does not flow between the first and second cylinder chambers 212 and 213, and the piston rod 210 is locked. Upon the opening or closing of the solenoid-controlled valve 215, the lift 204 is vertically moved or stopped by means of the hydraulic locking cylinder 209.

Figure 24:
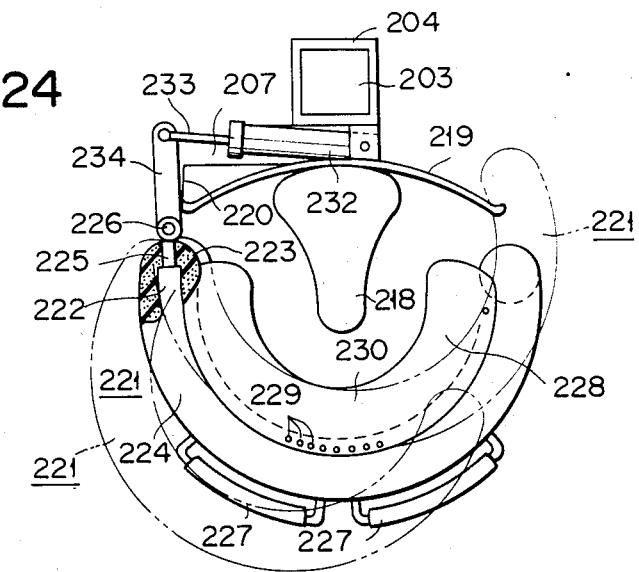
FIG. 24 is a partially sectional plan view thereof.
Figure 26:
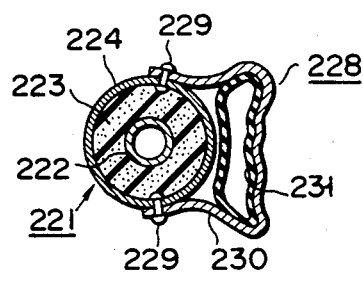
FIG. 26 is a sectional view of a support.
Figure 27:
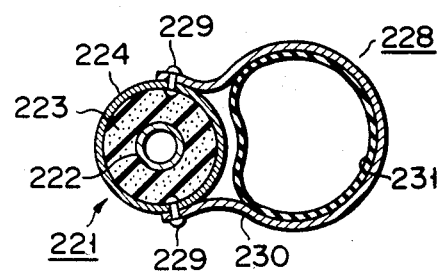
FIG. 27 is a sectional view of an expanded bag.
Figure 28:
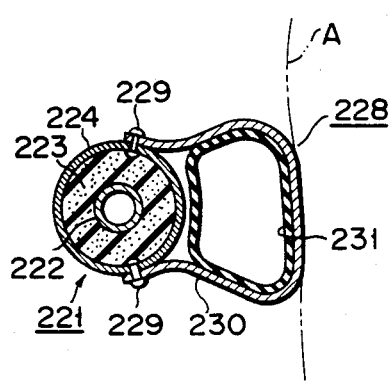
FIG. 28 is a sectional view of the expanded bag which is in tight contact with the passenger's body.
Figure 25:
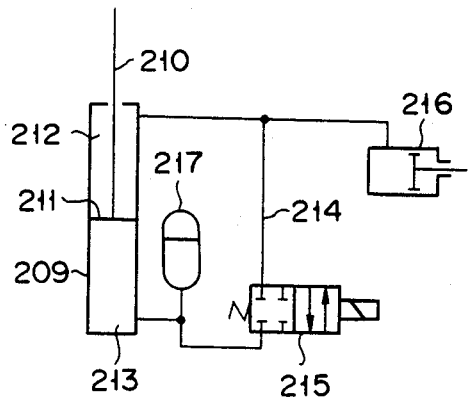
FIG. 25 is a hydraulic circuit diagram therefor.

A saddle 218 is mounted at the upper surface of the stay 208. The passenger A can stand astride the saddle 218 which is as small as a bicycle saddle. A pelvic support 219 is mounted at the front side of the brackets 206 and 207. The pelvic support 219 supports the pelvic portion of the body of the passenger A from the back and has a smooth arcuated shape. One side of the highest bracket 207 extends horizontally, and its extended end is bent toward the front. An abdominal support 221 is disposed at the front end of a bending portion 220 to support the passenger A. The abdominal support 221 supports the lower torso of the passenger A and is substantially C-shaped when viewed from the top. The abdominal support 221 comprises a frame 222, a cushion 223 of soft rubber which surrounds the frame 222, and a sheet 224 which surrounds the surface of the cushion 223. A support arm 225 extends backward from one end of the frame 222. The distal end of the support arm 225 is connected to the bending portion 220 to be pivotal about a shaft 226. The abdominal support 221 is pivotal about the shaft 226 and is adjusted in accordance with the figure of the passenger A. Two grip handles 227 are mounted at two portions of the abdominal support 221. In this embodiment, an expandable bag 228 is mounted inside the abdominal support 221. As shown in FIGS. 24 and 28, the expandable bag 228 comprises an expandable outer shell 230 which is mounted on the inner surface of the abdominal support 221 by a number of rivets 229, and an expandable rubber tube 231 which is mounted inside the expandable outer shell 230. The abdominal support 221 is set to surround the lower torso of the passenger A, and air is introduced in the expandable rubber tube 231 through a hose (not shown). The expandable bag 228 is expanded as shown in FIG. 27 to surround the body portion of the passenger A. The air may be supplied by a foot pump (not shown) by the passenger A.

A hydraulic locking cylinder 232 is transversely disposed on the highest bracket 207. The distal end of a piston rod 233 of the hydraulic locking cylinder 232 is connected to a pivot lever 234 which is an extended portion of the support arm 225. The hydraulic locking cylinder 232 is not illustrated in detail, but a solenoid-controlled valve is used to open/close the hydraulic circuit in the same manner as the hydraulic locking cylinder 209. When the solenoid-controlled valve is closed, the piston rod 233 is locked and the movement of the abdominal support 221 is prevented. The solenoid-controlled valves 215 of the hydraulic locking cylinders 209 and 232 are connected to a switch of the operator's console and are opened/closed by the ON/OFF state of the switch.

One end of a gas spring 235 is connected to the bracket 202. A piston rod 236 is connected to one side surface of the lift 204 through a bracket 237. The gas spring 235 supports the overall weight of the lift 204 including the saddle 218, the pelvic support 219 and the abdominal support 221. When the solenoid-controlled valve 215 of the hydraulic locking cylinder 209 is opened, the passenger A can easily move the lift 204 vertically.

The hydraulic locking cylinder 209 in this embodiment has the locking function and the damping function after the height of the lift 204 is adjusted. When the lift 204 is locked and when the main body 2 nose-dives, an excessive gravity force is applied to the piston rod 210 through the saddle 218, the abdominal support 221 and the lift 204. Thus, the oil pressure in the second cylinder chamber 213 is increased, and the oil in the second cylinder chamber 213 is moved into the accumulator 217, thus lowering the piston rod 210 and providing the damping effect for an overload. At this time, since the first cylinder chamber 212 is kept at a negative pressure, oil in the reservoir tank 216 is drawn into the first cylinder chamber 212. When the overload described above is eliminated, the piston rod 210 returns to the previous position by means of the accumulator 217. The oil in the first cylinder chamber 212 returns to the reservoir tank 216. As a result, the initial locking condition is restored.

The operation of the above standing position support apparatus will now be described. When the main body is stopped at the track platform, the piston rods 210 and 233 of the hydraulic locking cylinders 209 and 232 are free since the operator sets the switch in the ON position. The abdominal support 221 is free to pivot and can be vertically moved together with the saddle 218 and the pelvic support 219. When the passenger A gets on the main body of the vehicle, he adjusts the height of the saddle 218 and the abdominal support 221 with his hand in accordance with his height. The passenger A then stands astride the saddle 218 and pulls the abdominal support 221 toward him so as to surround his lower torso. The passenger A then presses a foot pedal to expand the expandable bag 228 which is brought into tight contact with his lower torso. When the operator confirms that all the passengers have completed the above operation, the operator turns off the switch to lock the hydraulic locking cylinders 209 and 232. Thus, the saddle 218, the pelvic support 219 and the abdominal support 221 are respectively secured in the desired positions. Furthermore, the abdominal support 221 is locked so as not to pivot horizontally. The passenger A is thus supported in the upright posture. Thereafter, the main body of the vehicle starts to perform sharply upward, downward or curved movement.

According to the standing position support apparatus of this type, since the abdominal support 221 surrounds the lower torso of the passenger A, the passenger A is safely supported in the upright posture. Furthermore, since the upper half of the body of the passenger A can be freely moved because the upper half of the body is not surrounded by a frame or the like, a wide view is assured in front of the passenger A. The passenger A feels as if he were standing on the coaster by himself. He thoroughly enjoys thrilling excitement when large turns and nose dives are performed while he is standing on the coaster.

Figure 29:
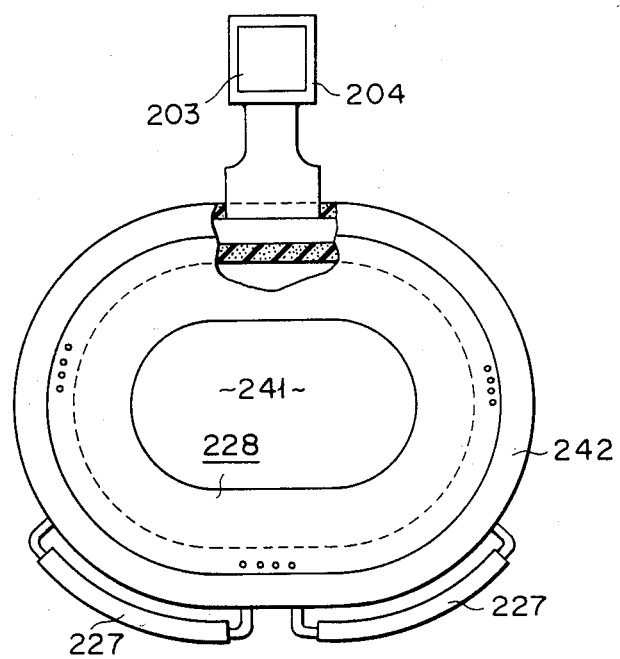
FIG. 29 is a plan view showing a partial section of a modification of a support.

In the above embodiment, the abdominal support has a substantially C-shape. However, as shown in FIG. 29, an abdominal support 242 may have a ring shape with a through hole 241 through which the passenger A inserts himself. In this case, the abdominal support 242 need not be pivotal, so that a special linking mechanism and a hydraulic locking cylinder for securing the abdominal support 242 in a predetermined position need not be used, resulting in a simple structure.

In the above embodiment, the expandable bag is mounted on the inner surface of the abdominal support. However, if the abdominal support has a structure which does not allow a space between the torso and the abdominal support, the expandable bag need not be mounted.

Furthermore, in the above embodiment, the hydraulic locking cylinder for adjusting the height-adjusting mechanism has a damping function. However, the hydraulic locking cylinder may have only the height-adjusting function. The damping function may be provided by a separate mechanism. Various changes and modifications may be provided within the spirit and scope of the present invention.

A standing support apparatus according to a sixth embodiment of the present invention will be described with reference to FIGS. 30 to 33. A step 305 is formed on the floor of a main body 303 of the vehicle. The passenger A stands on the step 305. A column 306 made of a U-shaped steel material extends vertically on the step 305. The column 306 has right and left side frames made of a U-shaped steel material which constitute guide rails 307a and 307b in the vertical direction. A lift 308 is supported by the column 306. The lift 308 comprises an upper beam 309 and a lower beam 310 and a rod 311 extending between the upper and lower beams 309 and 310. Rollers 312 are disposed at the ends of the upper and lower beams 309 and 310 and are guided by the guide rails 307a and 307b. Thus, the lift 308 is supported by the column 306 to be vertically movable therealong. A hydraulic locking cylinder 313 for adjusting the height of the lift 308 is disposed between the lower beam 310 and the step 305 or between the lower beam 310 and the main body 303 of the vehicle. The locking cylinder 313 and the lift 308 constitute a height-adjusting mechanism. The cylinder rod is extended or shortened to adjust the height of the lift 308. When the oil pressure is kept constant, the lift 308 is kept at a given height.

Figure 30:
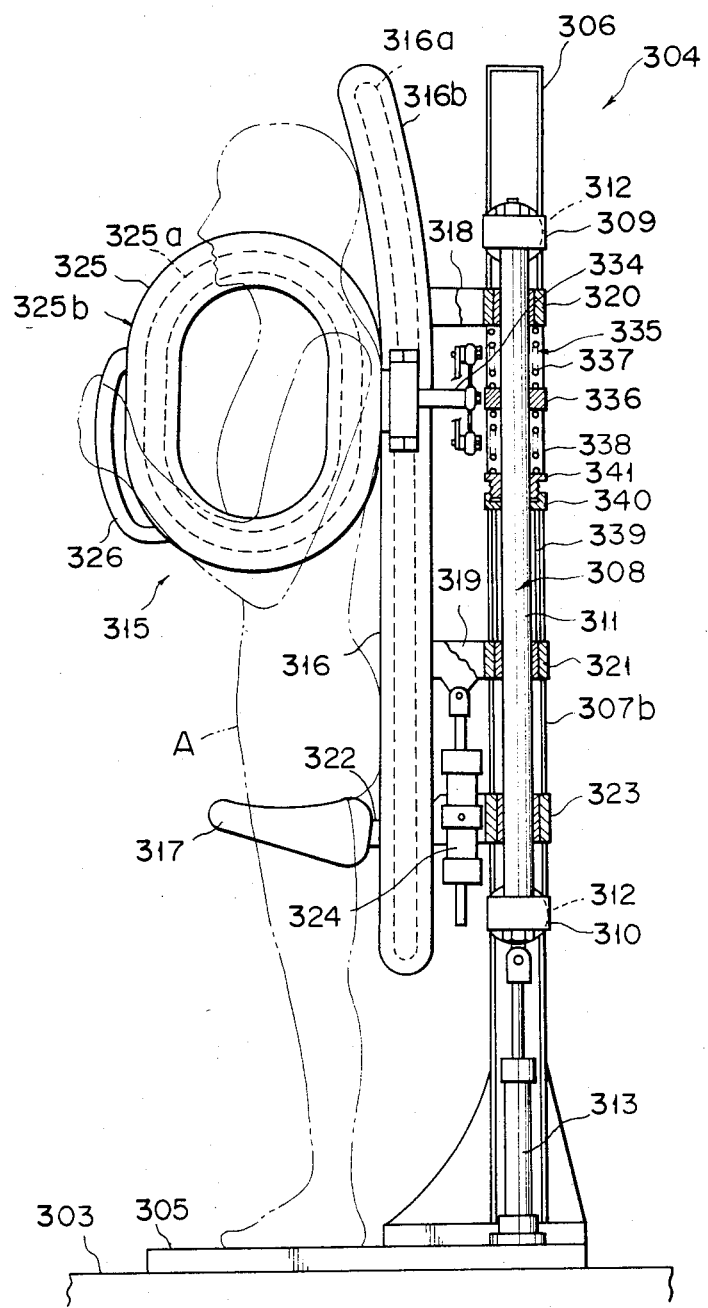
FIG. 30 is a side view of a standing position support apparatus according to a sixth embodiment of the present invention.

A body safety support mechanism 315 is mounted at the front side of the lift 308 to be vertically movable. The body safety support mechanism 315 has a back support 316 and a saddle 317 as the major components. The back support 316 comprises a frame 316a of an elliptical pipe and a cushion 316b of thick rubber which covers the frame 316a. As shown in FIG. 30, the passenger A can rest his head and back on the back support 316. The back support 316 has a pair of integral arms 318 and 319 which extend backward. The arms 318 and 319 are mounted to the rod 311 of the lift 308 respectively through slide sleeves 320 and 321 to be vertically movable. The saddle 317 resembles a bicycle saddle, but does not resemble a chair in which the passenger can deeply sit, so that the passenger A can stand astride the saddle 317. The saddle 317 has an arm 322 which is connected to the rod 311 through a slide sleeve 323 so as to be vertically movable. A hydraulic locking cylinder 324 is disposed between the slide sleeve 323 and the arm 319 to adjust a relative distance between the back support 316 and the saddle 317. After such adjustment is performed, the hydraulic locking cylinder 324 is locked to secure the relative distance described above. Thus, the back support 316 and the saddle 317 are moved integrally in a vertical direction along the rod 311.

Figure 32:
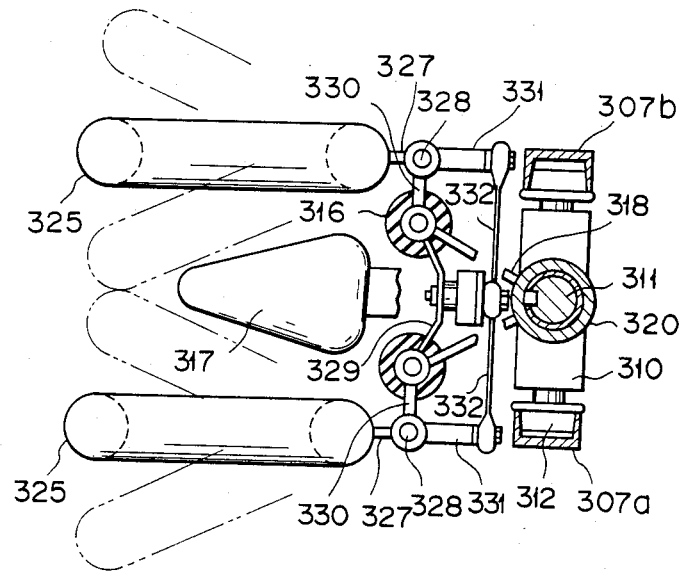
FIG. 32 is a cross-sectional view of the standing position support apparatus shown in FIG. 30.
Figure 33:
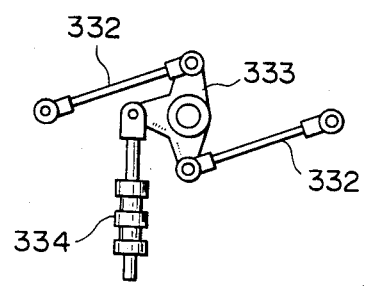
FIG. 33 is a view for explaining an opening/closing link mechanism of a body clamper.
Figure 34:
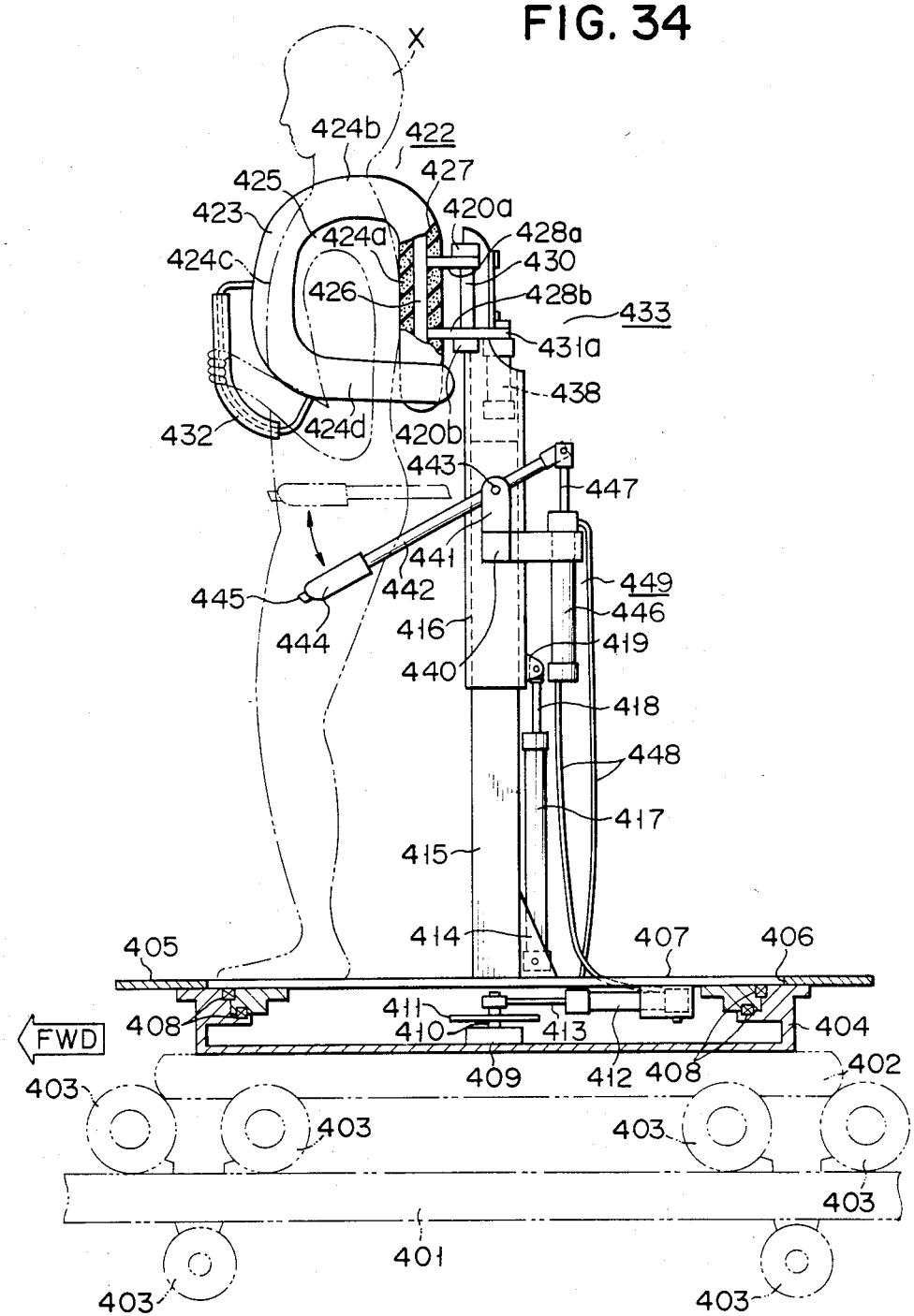
FIG. 34 is a side view showing a partial section of a standing position support apparatus according to a seventh embodiment of the present invention.
Figure 35:
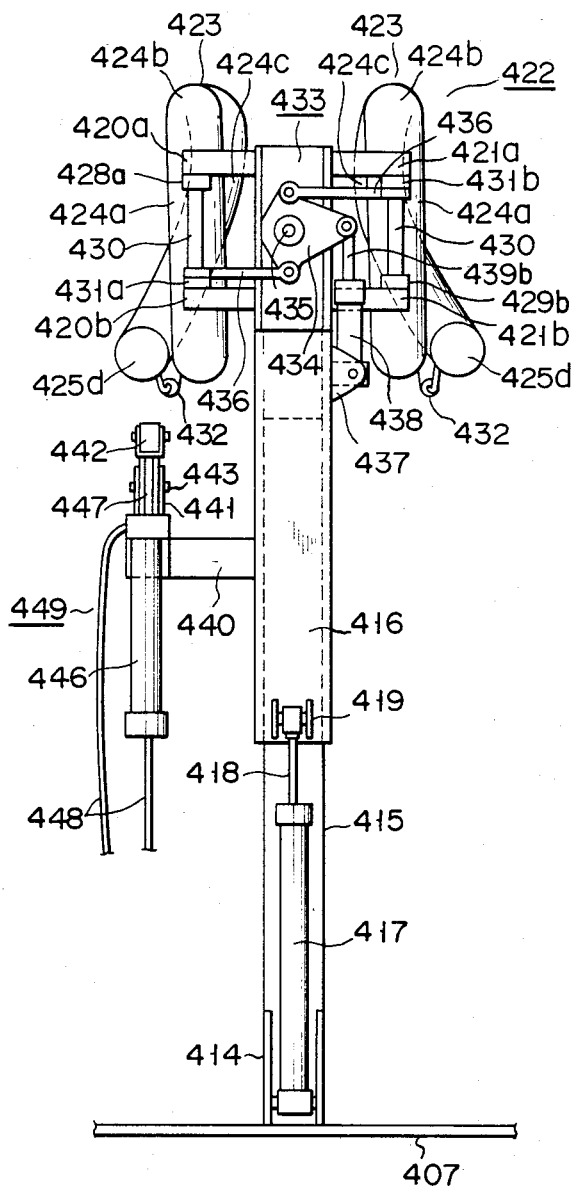
FIG. 35 is a rear view of the standing position support apparatus shown in FIG. 34.
Figure 36:
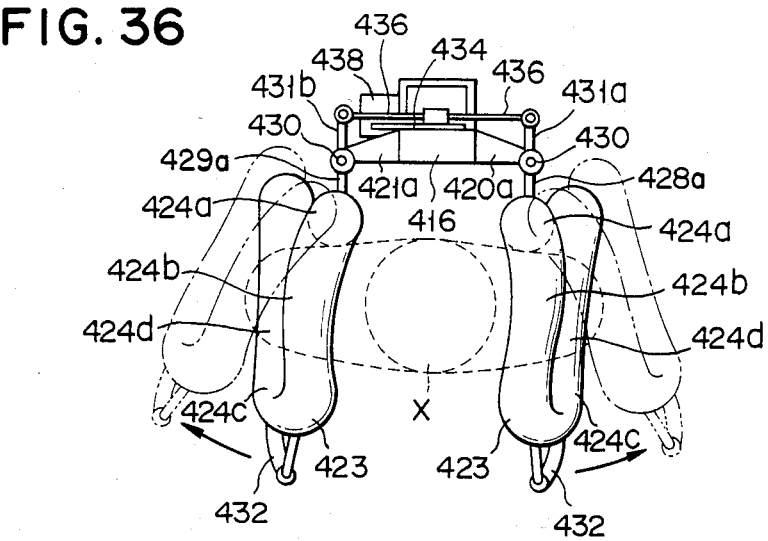
FIG. 36 is a plan view of the standing position support apparatus shown in FIG. 34.

Right and left shoulder holders 325 are mounted at the back support 316 and extend forward therefrom. Each shoulder holder 325 comprises a frame 325a of a substantially elliptical pipe loop and a cushion 325b of rubber which covers the frame 325a. The right and left shoulder holders 325 respectively have grip handles 326 formed integrally therewith. As shown in FIG. 32, the shoulder holders are pivotally supported by bearings 328 through arms 327 connected thereto. Thus, the shoulder holders 325 can be horizontally pivoted. The passenger A inserts his arms through the shoulder holders 325 and holds the grip handles 326. The passenger A then pulls the shoulder holders 325 toward himself, so that the shoulder holders 325 are brought into contact with his shoulders and sides. The bearings 328 are supported by support arms 330 extending from a bracket 329 fixed at the rear surface of the back support 316. The arms 327 are integral with rear levers 331 which are, in turn, pivotally connected to link levers 332. As shown in FIG. 33, the link levers 332 are connected to a pivot plate 333 which is pivotal about the bracket 329. The pivot plate 333 is connected to a hydraulic locking cylinder 334 for safety locking. After the shoulder holders 325 are interlockingly moved to desired positions, the hydraulic circuit (not shown) is closed to lock the shoulder holders 325.

Figure 31:
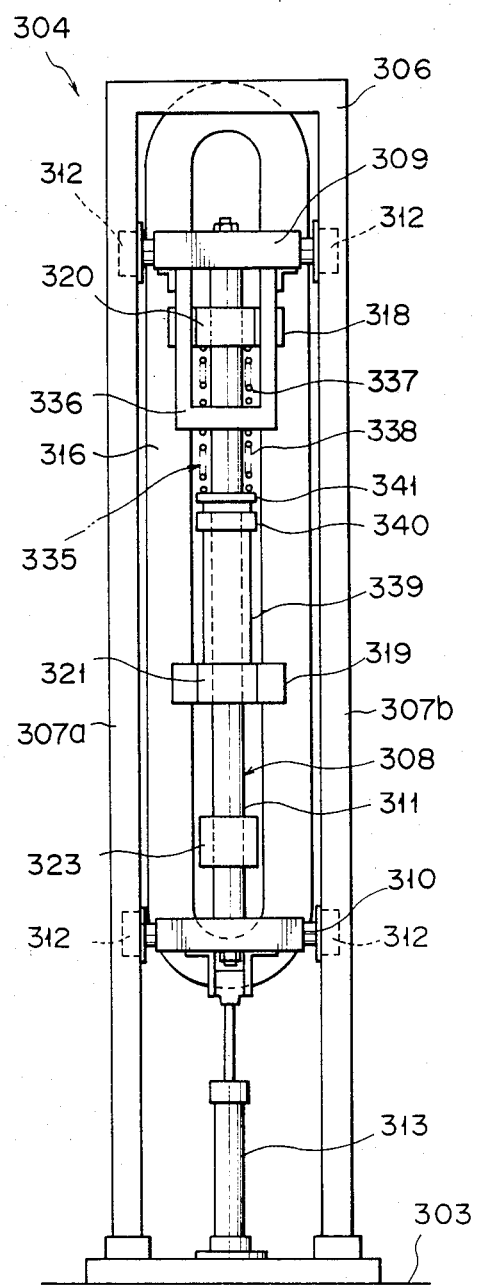
FIG. 31 is a rear view of the standing position support apparatus shown in FIG. 30.

A damper unit 335 is disposed between the lift 308 and the body safety support mechanism 315. A support frame 336 is mounted at the upper beam 309. The support frame 336 is substantially U-shaped, as shown in FIG. 31. The support frame 336 is disposed between the slide sleeves 320 and 321 and allows the rod 311 to extend therethrough. Therefore, the rod 311 is supported by the support frame 336. An upper spring 337 is hooked between the upper slide sleeve 320 and the support frame 336. The upper spring 337 urges the upper slide sleeve 320 upward. A lower spring 338 is hooked between an adjusting bolt 341 as will be set forth later and the support frame 336. The lower spring 338 urges the lower slide sleeve 321 downward. The lower slide sleeve 321 holds a nut 340 through a tube 339. An adjusting bolt 341 which also functions as a spring seat for supporting the lower end of the lower spring 338 is movably screwed in the nut 340. When the position of the adjusting bolt 341 is adjusted, the initial tension of the upper and lower springs 337 and 338 is changed.

The effect of the apparatus of the above structure will be described.

When the standing loop coaster having a plurality of main bodies 303 is stopped at the truck platform, passengers are supported on the body safety support mechanisms 315 in the following manner. The passenger A stands astride the saddle 317 and vertically adjusts the height of the back support 316 to rest his back and head on it while he is standing. Further, the passenger A vertically adjusts the saddle 317 to manually set it to the height of his crotch while he is standing. When such adjustments are completed, the passenger A inserts his right and left arms into the right and left shoulder holders 325, respectively. The passenger A then pulls the shoulder holders 325 toward himself so as to bring the shoulder holders 325 into tight contact with his shoulders and sides. Further, the passenger A holds the grip handles 326. When the operator confirms that all the passengers are set, he closes the hydraulic circuit. The locking cylinder 313 for adjusting the height of the body safety support mechanism 315 is locked to prohibit the movement of the lift 308. At the same time, the hydraulic locking cylinder 324 is locked to prohibit the movement of the saddle 317, and the hydraulic locking cylinder 334 is locked to prohibit the pivotal movement of the shoulder holders 325. The hips of the passenger may not be removed from the saddle 317 while he is kept securely standing, supported by the body safety support mechanism 315. Thus, the passenger A may not fall in any direction.

When the main body 303 starts rolling along the track and when it nose-dives or rolls up an ascending track, the back of the body and the back of the head of the passenger A are brought into tight contact with the back support 316. Furthermore, the shoulders and sides of the body of the passenger A are supported by the shoulder holders 325, and the upper half of the body of the passenger A is safely supported and protected. However, when the main body 303 rolls down a descending track and is decelerated, that is, when the passenger A tends to incline forward, the shoulder holders 325 prevent forward inclination. Further, since the passenger holds the grip handles 326, forward inclination of the passenger A can be further prevented.

When the main body 303 nose-dives on the descending track, a gravity (G) force corresponding to a load of several multiples of the passenger's weight is experienced. If no safeguard is provided, an overload is applied to the legs of the passenger, resulting in an undesirable accident. However, since the passenger stands astride the saddle 317, the overload is applied both to the legs and to the hip portion, the latter of which is the strongest portion of the body. Furthermore, since the shoulders are supported by the right and left shoulder holders 325, the overload is also weakened by being received at the sides of the body. Further, the upper spring 337 of the damper unit 335 supports the back support 316 through the upper slide sleeve 320 and the arm 318, so that the upper spring 337 absorbs a downward overload, thus decreasing the downward overload.

When the main body 303 shifts from zooming to a nose dive, that is, when the passenger body tends to be moved upward, the upward movement of the passenger is prevented since the shoulders are supported by the shoulder holders 325. At this time, since the lower spring 338 receives the upward force from the lower slide sleeve 321, the lower spring absorbs the upward force, thus cancelling the impact.

In any driving condition of the standing loop coaster, the passenger is safely kept in the upright posture, so that he can enjoy thrilling excitement which cannot be obtained in any sitting type roller coaster. Further, the body safety support mechanism 315 comprising the back support 316 and the saddle 317 can be supported to be vertically movable by means of the damper unit 335 which comprises the upper and lower springs 337 and 338. As a result, an impact is absorbed by the damper unit 335, thus preventing an overload from being applied to the knees of the passenger.

The present invention is not limited to these particular embodiments, but may be extended to a loop coaster which orbits along a track and to a screw coaster or a chairoplane besides the standing loop coaster.

A hydraulic cylinder having an accumulator, an air cylinder, or a combination of a spring therewith can be used in place of the damper unit 335 which comprises the upper and lower springs 337 and 338.

A standing position support apparatus according to a seventh embodiment of the present invention will be described with reference to FIGS. 34 to 39.

Figure 37:
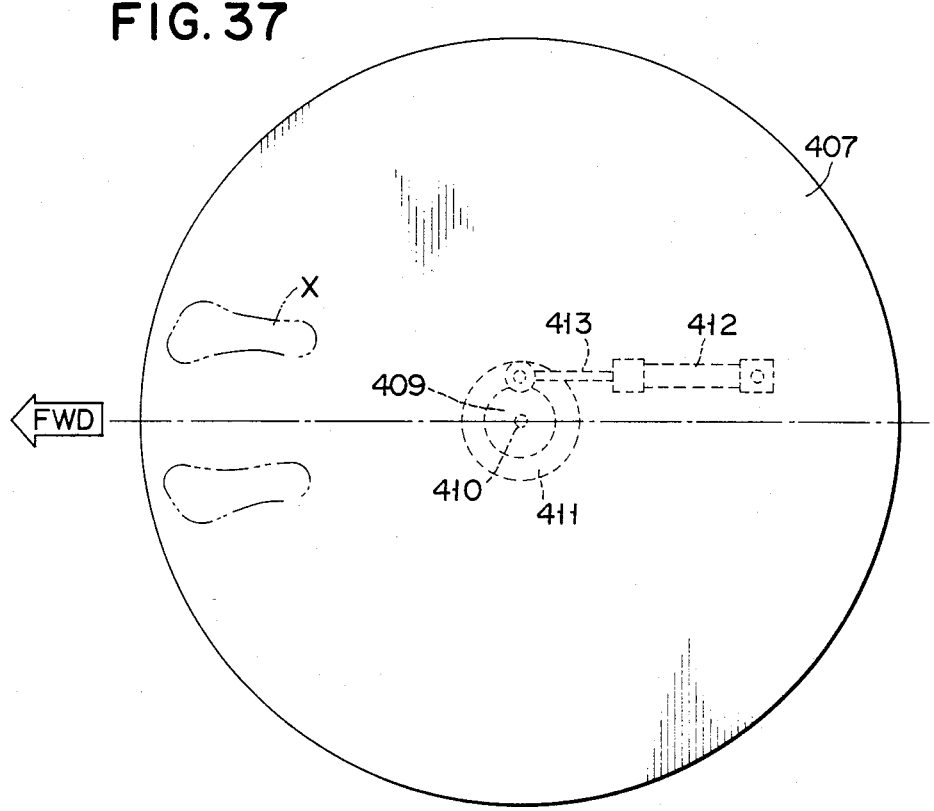
FIG. 37 is a plan view showing a turntable driving source for the standing position support apparatus shown in FIG. 34.
Figure 38:
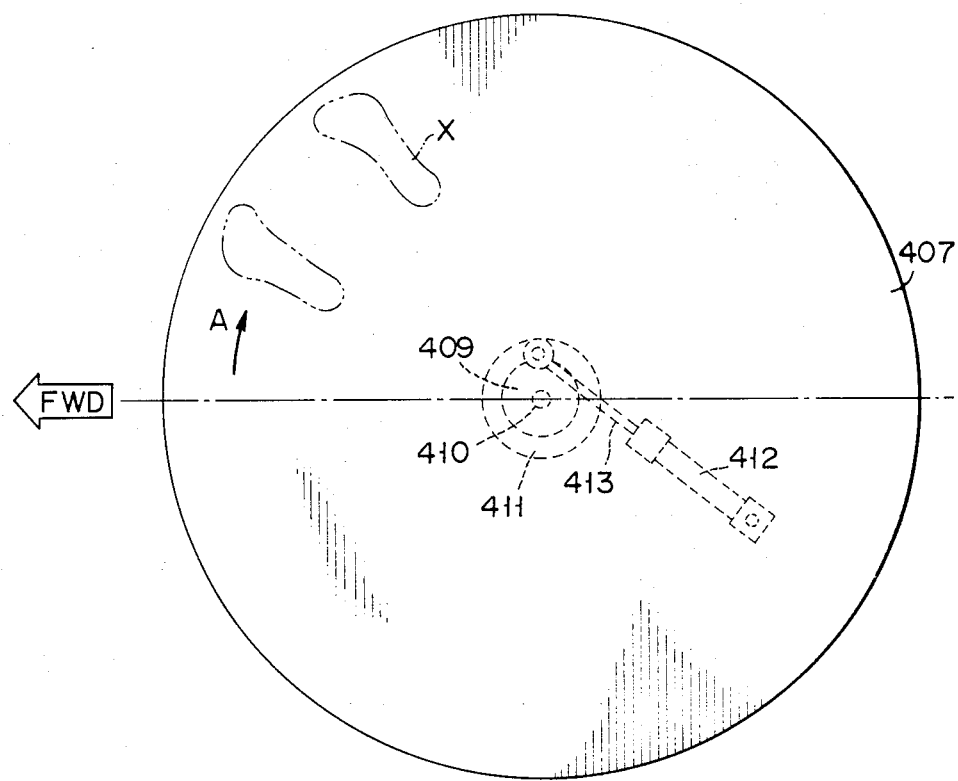
FIGS. 38 and 39 are views for explaining the mode of operation of the standing position support apparatus shown in FIG. 34.
Figure 39:
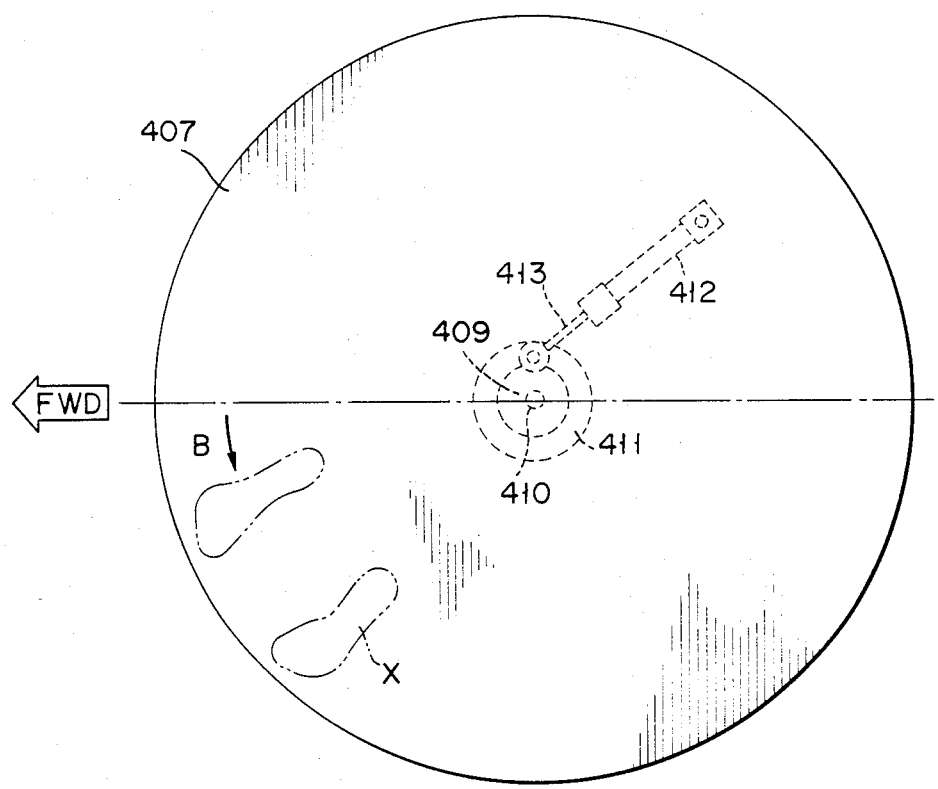
Figure 40:
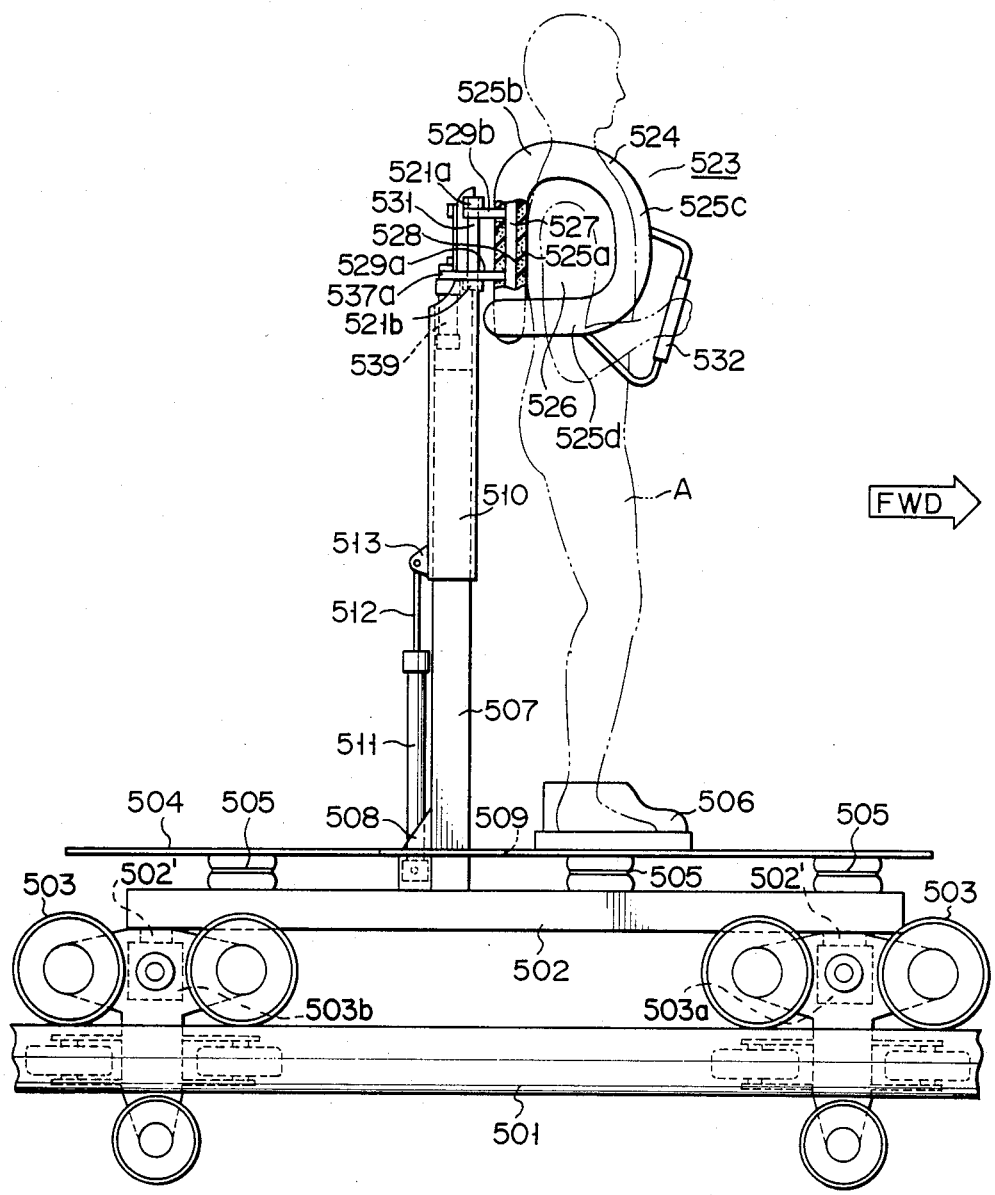
FIG. 40 is a side view showing a partial section of a standing position support apparatus according to an eighth embodiment of the present invention.
Figure 41:
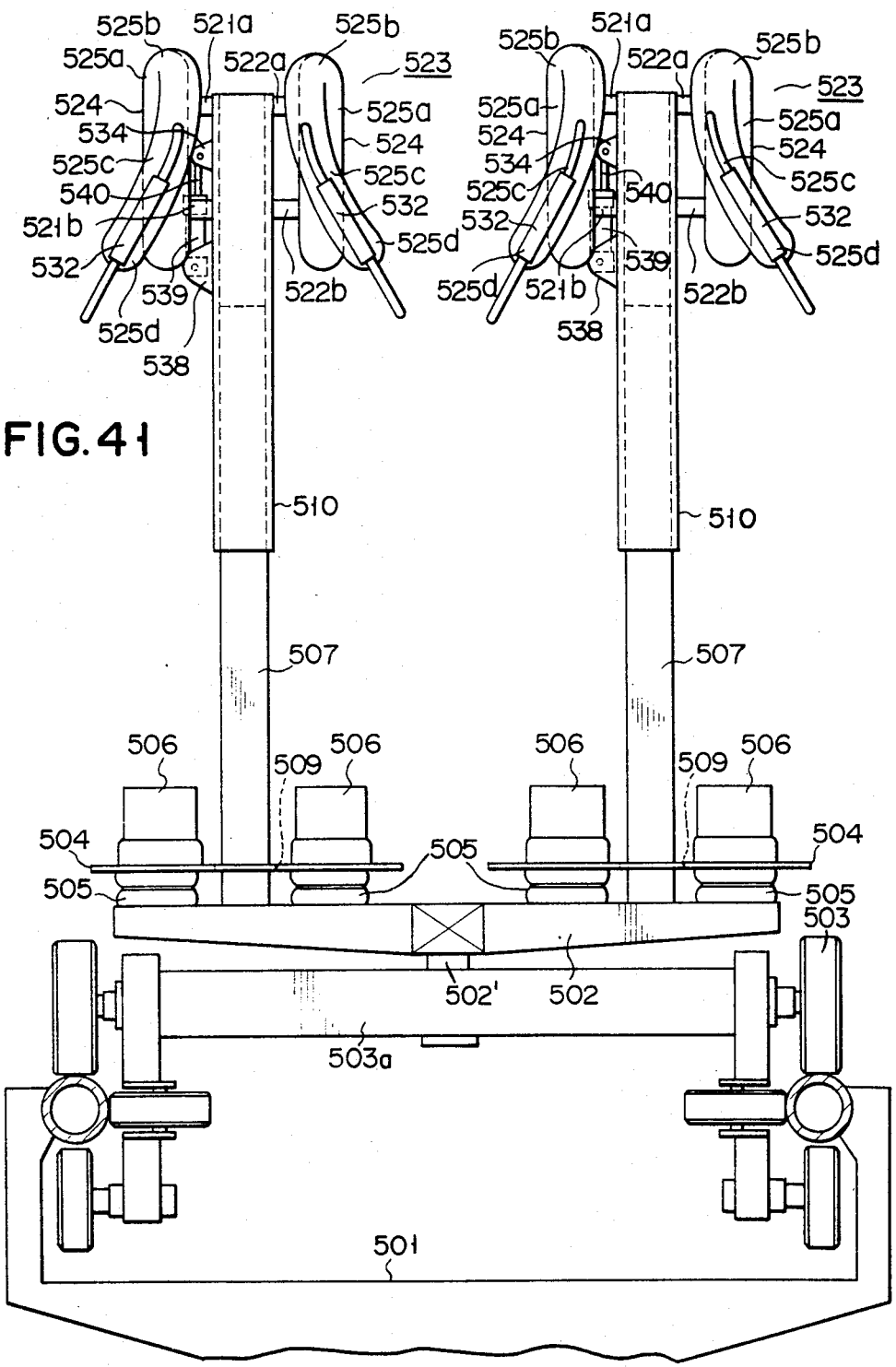
FIG. 41 is a front view of the standing position support apparatus shown in FIG. 40.

Reference numeral 401 denotes a track of a standing loop coaster; 402, a main body as a truck. The standing loop coaster has a plurality of main bodies 402 each of which is mounted on the track 401 through wheels 403. A stationary frame 404 is fixed on the main body 402. A top plate 405 is fixed to an upper opening 406 at the center of the stationary frame 404. A disc-shaped turntable 407 is slidably fitted in the opening 406 of the top plate 405. The turntable 407 is rotatably mounted at the opening 406 of the stationary frame 404 through bearings 408. A hydraulic rotary actuator 409 as a rotary locking mechanism is disposed at the bottom center of the stationary frame 404. The rotary actuator 409 causes a solenoid-controlled valve of the hydraulic circuit to open or close, so that a rotary shaft 410 is locked or unlocked. A rotary disc 411 is coaxially mounted on the rotary shaft 410. One end of a hydraulic locking cylinder 412 is pivotally supported at an eccentric position on the lower surface of the turntable 407. A piston rod 413 of the hydraulic locking cylinder 412 is rotatably supported at an eccentric position of the rotary disc 411, as shown in FIG. 37. The hydraulic locking cylinder 412 is manually operated by a passenger X as will be described later. A piston rod 413 of the hydraulic locking cylinder 412 is usually locked to function as a connecting rod so as to maintain the angular position of the turntable 407 stationary relative to the rotary disc 411 of the rotary actuator 409.

A column 415 having a square cross-section is vertically disposed at the standing support on the upper surface of the turntable 407 through a bracket 414. A lift 416 is fitted around the column 415 and is vertically slidable therealong. The lift 416 has a square cross-section. A hydraulic locking cylinder 417 is vertically disposed at the lower rear side of the column 415. The distal end of a piston rod 418 of the hydraulic locking cylinder 417 is connected to the lift 416 through a bracket 419. The configuration of the hydraulic locking cylinder 417 is not described in detail. However, the piston rod 418 is locked or unlocked by opening or closing the hydraulic circuit by the solenoid controlled valve. Upon the vertical movement of the piston rod 418, the lift 416 is vertically moved in accordance with the height of the passenger X. Thus, the hydraulic locking cylinder 417 serves as a height adjusting mechanism.

Brackets 420a and 420b are disposed at two different positions of the upper portion of the lift 416 and extend to the left therefrom, whereas brackets 421a and 421b are disposed at the corresponding two positions of the upper portion of the lift 416 and extend to the right therefrom. A body safety support mechanism 422 for supporting the passenger X is mounted on the brackets 420a, 420b, 421a and 421b. The body safety support mechanism 422 has right and left shoulder holders 423. Each shoulder holder 423 has a frame 426 comprising a back support frame portion 424a for supporting the two sides of the shoulders of the passenger X, a shoulder support frame portion 424b for supporting the shoulders of the passenger X, a chest support frame portion 424c for supporting the two sides of the chest of the passenger X, and a side support frame portion 424d for supporting the two sides of the body of the passenger X. The frame portions 424a, 424b, 424c and 424d define spaces into which the passenger's arms are inserted. The frame 426 is covered with a cushion 427 of soft rubber. Upper and lower support arms 428a and 428b, and 429a and 429b respectively extend backward from the left and right back support frame portions of the left and right shoulder holders 423, respectively. The distal ends of the upper and lower support arms 428a and 428b, and 429a and 429b are pivotally supported respectively by the brackets 420b and 420a, and 421b and 421a through shafts 430. The right and left shoulder holders 423 are pivotal about the shafts 430, respectively. The passenger X can adjust the distance between the right and left shoulder holders 423 in accordance with the width of his body. The distal ends of the support arms 428a and 429b respectively extending from the left and right shoulder holders 423 extend backward to constitute pivot levers 431a and 431b, respectively. Grip handles 432 are respectively disposed at the front sides of the chest support frame portions 424c of the right and left shoulder holders 423.

The shoulder holders 423 are connected to each other by a link mechanism 433. The link mechanism 433 has a pivot plate 434 which is secured to the rear surface of the lift 416 to be pivotal about a shaft 435. The first ends of link levers 436 are respectively connected to the upper and lower eccentric positions of the pivotal plate 434. The second ends of the link levers 436 are respectively symmetrically connected to the pivot levers 431a and 431b of the support arms 428a and 429b. When the passenger X pulls the shoulder holders 423 toward himself or pushes them away from him, the pivot plate 434 is pivoted about the shaft 435, so that the shoulder holders 423 are pivoted. A hydraulic locking cylinder 438 is vertically mounted at the upper portion of the lift 416 at the right side through a bracket 437. The upper end of a piston rod 439 of the hydraulic locking cylinder 438 is connected to the eccentric position of the pivot plate 434. The configuration of the hydraulic locking cylinder 438 is not described in detail. However, a piston rod 439 is locked or unlocked by opening or closing its hydraulic circuit by a solenoid-controlled valve (not shown). When the solenoid-controlled valve is closed, the piston rod 439 is locked, thus preventing the pivotal movement of the shoulder holders 423.

A bracket 440 extends to the left-hand side from the middle portion of the lift 416. A holder 441 is mounted on the upper surface of the distal end of the bracket 442. The intermediate portion of an operation lever 442 is vertically and movably supported at the holder 441 through a pin 443. A grip 444 is mounted at the distal end of the operation lever 442, so that the passenger X can grasp the grip 444 by his hand so as to vertically move it. A pushbutton 445 is disposed at the distal end of the grip 444. When the passenger X pushes the pushbutton 445, the operation lever 442 is released to be freely moved. A hydraulic locking cylinder 446 is vertically mounted at the rear side of the bracket 440. A piston rod 447 of the hydraulic locking cylinder 446 is connected to the end of the operation lever 442. The oil chamber of the hydraulic locking cylinder 446 communicates with the oil chamber of the hydraulic locking cylinder 412 for driving the turntable 407 through a rubber hose 448. When the passenger X pulls up the operation lever 442, the piston rod 447 is moved downward, so that the oil in the hydraulic locking cylinder 446 flows into the oil chamber of the hydraulic locking cylinder 412 through the rubber hose 448. As a result, the hydraulic locking cylinder 412 is operated to project the piston rod 413. The turntable 407 is then rotated in the direction indicated by arrow A in FIG. 38. However, when the passenger X pushes down the operation lever 442, the piston rod 439 is moved upward. The oil is withdrawn from the hydraulic locking cylinder 412. The piston rod 413 of the hydraulic locking cylinder 412 is moved to be withdrawn thereinto. Thus, the turntable 407 is rotated in the direction indicated by arrow B in FIG. 39. In this manner, the operation lever 442 and the hydraulic locking cylinder 446 constitute an operation mechanism 449.

The rotary actuator 409 and the solenoid-controlled valves of the hydraulic locking cylinders 417 and 438 are electrically connected to a switch of the operation console at the truck platform through power collecting brushes (not shown) disposed at the main body 402 and the trolley lines which contact the power collecting brushes and are disposed along the track 401. The operator turns on/off the switch to control the operation mechanism.

During operation, when the main body 402 is stopped at the truck platform, the operator turns on the switch. The rotary actuator 409 and the solenoid-controlled valves of the hydraulic locking cylinders 417 and 438 are opened, so that the turntable 407 is free to rotate, and the shoulder holders 423 are free to pivot and are vertically movable. In this condition, the passenger X gets on the turntable 407. The passenger X manually turns the turntable 407 directly or through the body safety support mechanism 422 to change the direction of the body safety support mechanism 422 to a desired direction. The passenger X then pushes up or pulls down the shoulder holders 423 to adjust them in accordance with his height and inserts his arms through the shoulder holders 423. The passenger X then pulls the shoulder holders 423 inward to bring them into tight contact with his shoulders and sides. When the operator confirms that all the passengers are set, he turns off the switch to close the rotary actuator 409 and the solenoid-controlled valves of the hydraulic locking cylinders 417 and 438. The rotational movement of the turntable 407 and the pivotal and vertical movements of the shoulder holders 423 are prohibited. Thus, the passenger X is held standing on the turntable 407 and faces in the desired direction that he has chosen.

After confirming the safety of the passengers, the operator starts the main body 402. When the passenger X holds the grip 444 of the operation lever 442 by his hand and when he pushes the pushbutton 445 to vertically move the operation lever 442 so as to drive the hydraulic locking cylinder 446 while the main body 402 is in motion, the oil pressure in the hydraulic locking cylinder 412 is changed to pivot the turntable 407 in a direction indicated by arrow A or B in accordance with the pivotal movement of the operation lever 442. Therefore, the passenger X can arbitrarily face any direction around the column 415 with respect to the travelling direction of the main body 402. When the passenger X releases the pushbutton 445 at a desired position of the operation lever 442, the operation lever 442 is held at this position. The turntable 407 is kept at a desired position, so that the passenger X enjoys travelling at the desired position. When the standing loop coaster returns to the truck platform after large turns, somersaults and nose dives are performed, the operator turns on the switch to release the locking state of the rotary actuator 409, the lift 416 and the shoulder holders 423. After the standing loop coaster is stopped at the truck platform, the turntable 407 is forced to turn to a predetermined position by the drive source mechanism so as to make the passenger X face the truck platform. The passenger X can thus easily get off the standing loop coaster.

As may be apparent from the above description, since the back, shoulders, chest and sides of the body of the passenger X are supported by the pair of shoulder holders 423 and since he is safely held standing on the turntable 407, he can enjoy nose dives and somersaults.

Furthermore, since the passenger X can change the direction of his body with respect to the travelling direction of the standing loop coaster, more thrilling excitement can be obtained when nose dives, large turns and somersaults are performed as if he were standing on the turntable 407 by himself.

A standing position support apparatus according to an eighth embodiment of the present invention will be described with reference to FIGS. 40 to 43.

Reference numeral 501 denotes a track of a standing loop coaster; 502, a main body as a chassis. The standing loop coaster has a plurality of main bodies 502 each of which is mounted on the track 501 through wheels 503 mounted at the front and back sides of the main body 502. Two floor plates 504 are disposed to be spaced apart from each other at the right and left sides above the main body 502. A plurality of damping elastic bodies such as gas springs 505 are sandwiched between the floor plates and the main body 502. The gas springs 505 elastically support the floor plate 504. Thus, the floor plate 504 is three-dimensionally movable independent of the main body 502. The degree of the movement of the floor plate 504 is determined by the number, elasticity and positions of the gas springs 505. A foot support 506 for determining the position of feet of the passenger A is secured to the floor plate 504.

Two columns 507 by which two passengers are respectively supported are vertically disposed on the upper surface of the main body 502 through brackets 508. Each column 507 extends above the floor plate 504 a through hole 509 which is formed substantially at the center of the floor plate 504. The column 507 has a square cross section, and a lift 510 is fitted therearound to be vertically movable therealong. The lower end of a hydraulic locking cylinder 511 is secured to the bracket 508. The hydraulic locking cylinder 511 is vertically disposed at the rear side of the column 507. The upper end of a piston rod 512 of the hydraulic locking cylinder 511 is connected to the lift 510 through a bracket 513. As shown in FIG. 43, the hydraulic locking cylinder 511 is partitioned into first and second cylinder chambers 515 and 516 by a piston 514 connected to the piston rod 512. The first and second cylinder chambers 515 and 516 communicate with each other by piping 517. A solenoid-controlled valve 518 is disposed in the piping 517. A reservoir tank 519 is disposed between the first cylinder chamber 515 and the solenoid-controlled valve 518. An accumulator 520 is disposed between the second cylinder chamber 516 and the solenoid controlled valve 518. When the solenoid-controlled valve 518 is opened, the first cylinder chamber 515 communicates with the second cylinder chamber 516 to free the piston rod 512. However, when the solenoid controlled valve 518 is closed, the oil does not flow between the first and second cylinder chambers 515 and 516 to lock the piston rod 512. Upon operation of the hydraulic locking cylinder 511, the lift 510 is vertically moved and the height of the lift 510 is adjusted in accordance with the height of the passenger A. The lift 510 is then locked after such an adjustment is completed.

Brackets 521a and 521b extend to the left at two different positions of the upper portion of the lift 510, whereas brackets 522a and 522b extend to the right at the corresponding positions of the upper portion of the lift 510. A body safety support mechanism 523 for supporting the passenger A is connected to the brackets 521a, 521b, 522a and 522b. The body safety support mechanism 523 has right and left shoulder holders 524. The shoulder holder 524 has a frame 527 comprising a back support frame portion 525a for supporting the two sides of the shoulders of the passenger A, a shoulder support frame portion 525b for supporting the shoulders of the passenger A, a chest support frame portion 525c for supporting the two sides of the chest of the passenger A, and a side support frame portion 525d for supporting the two sides of the body of the passenger A. The frame portions 525a, 525b, 525c and 525d define spaces into which the passenger's arms are inserted. The frame 527 is covered with a cushion 528 of soft rubber. Upper and lower support arms 529a and 529b, and 530a and 530b respectively extend backward from the left and right back support frame portions of the left and right shoulder holders 524, respectively. The distal ends of the upper and lower support arms 529a and 529b, and 530a and 530b are pivotally supported respectively by the brackets 521b and 521a, and 522b and 522a through shafts 531. The right and left shoulder holders 524 are pivotal about the shafts 531, respectively. The passenger A can adjust the distance between the right and left shoulder holders 524 in accordance with the width of his body. Grip handles 532 are disposed at the front sides of the chest support frame portions 525c of the right and left shoulder holders 524.

The shoulder holders 524 are connected to each other by a link mechanism 533. The link mechanism 533 has a pivot plate 534 which is secured to the rear surface of the lift 510 to be pivotal about a shaft 535. The first ends of the link levers 536 are respectively connected to the upper and lower eccentric positions of the pivotal plate 534. The second ends of the link levers 536 are symmetrically connected to the pivot levers 537a and 537b of the support arms 530b and 529a, respectively. When the passenger A pulls the shoulder holders 524 toward himself or pushes them away from him, the pivot plate 534 is pivoted about the shaft 535, so that the shoulder holders 524 are pivoted. A hydraulic locking cylinder 539 is vertically mounted at the upper portion of the lift 510 at the right side through a bracket 538. The upper end of a piston rod 540 of the hydraulic locking cylinder 539 is connected to an eccentric position of the pivot plate 534. The configuration of the hydraulic locking cylinder 539 is not described in detail. However, in the same manner as the hydraulic locking cylinder 511 for height adjustment, the piston rod 540 is locked or unlocked by opening or closing its hydraulic circuit by a solenoid-controlled valve (not shown). When the solenoid-controlled valve is closed to lock the piston rod 540, the pivotal movement of the shoulder holders 524 is prevented.

The hydraulic locking cylinder 511 for height adjustment in this embodiment has a locking function of the lift 510 and a damping function to eliminate an overload imposed on the passenger A. When the lift 510 is locked and when a nose dive or somersault is performed, an overload is applied to the piston rod 512 through the shoulder holders 524 and the lift 510. The oil pressure of the second cylinder chamber 516 is increased, so that the oil therein flows into the accumulator 520. The piston rod 512 is lowered, and the first cylinder chamber 515 is held at a negative pressure. The first cylinder chamber 515 thus withdraws oil from the reservoir tank 519. When the overload is eliminated, the piston rod 512 returns to the previous position by means of the accumulator 520. As a result, the oil flows from the first cylinder chamber 515 to the reservoir tank 519 and the previous locking state is restored.

The solenoid-controlled valve 518 for the hydraulic locking cylinders 511 and 539 is electrically connected to a switch arranged on the operation console (not shown) at the truck platform through power collecting brushes disposed along the main body 502 and the trolley lines which contact the power collecting brushes and are disposed along the track 501. The operator turns the switch on/off to open/close the solenoid-controlled valve 518.

During operation, when the standing loop coaster is stopped at the truck platform, the operator keeps the switch ON, so that the piston rods 512 and 540 of the hydraulic locking cylinders 511 and 539 are free. The shoulder holders 524 are thus free to pivot and can be vertically moved. When the passenger A gets on the floor plate 504 which is elastically supported on the main body 502, he holds the shoulder holders with his hands and vertically moves them to adjust their height in accordance with his height. The passenger A then inserts his arms through the shoulder holders 524 and pulls the shoulder holders 524 inward to bring the cushion covered frame portions into tight contact with his shoulders, back, chest and sides. The passenger A then inserts his feet into the foot support 506. When the operator confirms that all the passengers are set, he turns off the switch to close the solenoid-controlled valve 518 of the hydraulic locking cylinders 511 and 539. The shoulder holders 524 are set in a desired position corresponding to the height of the passenger A. Further, the pivotal movement of the shoulder holders 524 is prohibited. The passenger A is held standing on the floor plate 504 and faces front. In this case, since the floor plate 504 is supported on the main body 502 through the gas springs 505, the floor plate 504 swings vertically and horizontally independently of the column 507 extending on the main body 502. As a result, the passenger A stands on an unstable floor plate. Thereafter, the main body 502 starts rolling to perform quick turns, nose dives, zoomings and somersaults and returns to the truck platform.

standing position support apparatus according to the eighth embodiment of the present invention as described above, since the floor plate 504 swings freely, the foot portion of the passenger A three-dimensionally swings in accordance with a change in acceleration speed of the main body 502 and a change in the center of gravity of the passenger A. The horizontal movement in all directions, the vertical movement, and the rotary movement such as rolling and pitching are combined to produce the complex movement of the floor plate 504. Therefore, the passenger A feels as if he were riding on ski boards or a surf board, thus obtaining thrilling excitement which cannot be obtained by a conventional rolling coaster. Furthermore, when nose dives, quick turns, and somersaults are performed, he enjoys thrilling excitement as if he were standing on the floor plate by himself.

The floor plate is a flat board in the above embodiment. However, the shape of the floor plate may be of a surf board or a yacht. Furthermore, the floor plate may be subdivided into two pieces of boards such as ski boards.

The elastic body need not be limited to the gas spring. A coil spring may be used in place of the gas spring. Furthermore, the foot support need not be used. In this case, the feet of the passenger can be freely moved.

Furthermore, the present invention may be applied to any other roller coaster, a screw coaster and a chairoplane or the like.

What is claimed is:

1. A standing position support apparatus for an amusement vehicle, comprising:
   (a) a main body of said amusement vehicle, which is free to move along a track;
   (b) a standing position support column extending vertically from said main body;
   (c) a height-adjusting mechanism movable vertically along said column and which comprises first locking means for locking said height-adjusting mechanism appropriate to the height of a passenger; and
   (d) a passenger safety support mechanism for supporting the passenger in a standing posture, comprising a pair of right and left arm-insertion members for holding the passenger from the back at both sides and from over and around the shoulders down to the sides, each of said arm-insertion members vertically pivotally mounted on said height-adjusting mechanism, and second locking means operatively connected to said arm-insertion members for locking said arm-insertion members at a desired closed position.

2. A standing position support apparatus for an amusement vehicle according to claim 1, wherein said second locking means comprises an arm-insertion member locking cylinder operatively connected to said height-adjusting mechanism.

3. A standing position support apparatus for an amusement vehicle according to claim 2, wherein each of said arm-insertion members is annular and said height-adjusting mechanism further comprises a pair of right and left vertical shafts proximate to its rear side, wherein said right and left arm-insertion members are vertically pivotally mounted on said right and left vertical shafts, respectively.

4. A standing position support apparatus for an amusement vehicle according to claim 3, wherein each of said arm-insertion members comprises:
   (a) a back support frame portion pivotally mounted to said respective vertical shaft for supporting the back of the passenger;
   (b) a shoulder support frame portion operatively connected to said back support frame portion for extending over and around one shoulder of the passenger and down to one side of the passenger;
   (c) a chest support frame portion operatively connected to said shoulder support frame portion for supporting the chest of the passenger, said back, shoulder and chest support frame portions defining a plane; and
   (d) a side support frame portion for supporting one side of the passenger having a first end and a second end, wherein said fisst end of said side support frame portion is operatively connected to said chest support frame portion and wherein said second end of said side support frame portion deviates outwardly from said plane in relation to the passenger.

5. A standing position support apparatus for an amusement vehicle according to claim 3, wherein each of said arm-insertion members comprises a bag along the inner surface thereof, said bag being expandable to an expanded position and shrinkable to a shrunken position upon introduction and discharge of a fluid, respectively, so that in the expanded position said bag tightly supports the back, shoulder, chest and one side of the passenger.

6. A standing position support apparatus for an amusement vehicle according to claim 3, wherein said passenger safety support mechanism further comprises a pelvic support mounted on said height-adjusting mechanism.

7. A standing position support apparatus for an amusement vehicle according to claim 3, wherein said passenger safety support mechanism further comprises a pelvic support mounted on said height-adjusting mechanism; an abdominal support of an inverted L-shaped configuration for supporting the lower torso of the passenger in a horizontal direction, said abdominal support being pivotally mounted on said height-adjusting mechanism; and an abdominal support locking cylinder mounted on said height-adjusting mechanism suitable for locking said abdominal support at a desired closed position.

8. A standing position support apparatus for an amusement vehicle, comprising:
   (a) a main body of said amusement vehicle, which is free to move along a track;
   (b) a standing position support column extending vertically from said main body;
   (c) a height-adjusting mechanism movable vertically along said column and which comprises locking means for locking said height-adjusting mechanism appropriate to the height of a passenger; and
   (d) a passenger safety support mechanism for supporting the passenger in a standing posture, comprising an arcuate abdominal support for supporting the lower torso of the passenger in a horizontal direction, said abdominal support comprising grip handles at its front side and being pivotally supported at one end by a shaft mounted on the height-adjusting mechanism; a pelvic support mounted on said height-adjusting mechanism; and an abdominal support locking cylinder mounted on said height-adjusting mechanism and which locks said abdominal support in a desired closed position.

9. A standing position support apparatus for an amusement vehicle, comprising:
(a) a main body of said amusement vehicle, which is free to move along a track;
(b) a standing position support column extending vertically from said main body;
(c) a height-adjusting mechanism movable vertically along said column and which comprises hydraulic locking means for locking said height-adjusting mechanism appropriate to the height of a passenger, said hydraulic locking means comprising:
(i) a locking cylinder having first and second chambers partitioned by a piston;
(ii) a switch valve in fluid communication with said first and second chambers, said valve having a closed state and an open state, wherein when said valve is in said closed state said first and second chambers are not in fluid communication, substantially locking said piston relative to said cylinder and substantially locking said height-adjusting mechanism relative to said column, and wherein when said valve is in said open state said first and second chambers are in fluid communication, allowing motion of said piston relative to said cylinder and allowing motion of said height-adjusting mechanism relative to said column; and
(iii) an accumulator in fluid communication with said first chamber, said accumulator permitting said height-adjusting mechanism, even in a substantially locked position relative to said support column, to move downwardly with respect to said support column, whereby excessive gravity force applied to the passenger associated with the upward, downward or curved movement of the vehicle can be weakened; and
(d) a passenger safety support mechanism operatively connected to said height-adjusting mechanism to safely hold the passenger in a standing posture.

10. A standing position support apparatus for an amusement vehicle, comprising:
(a) a main body of said amusement vehicle, which is free to move along a track;
(b) a standing position support column extending from said main body;
(c) a passenger safety support mechanism for safely holding the passenger in a standing posture; and
(d) a height-adjusting mechanism operatively supporting said passenger safety support mechanism movable vertically along said column and which comprises hydraulic locking means for locking said height-adjusting mechanism appropriate to the height of a passenger, said hydraulic locking means comprising:
(i) a locking cylinder operatively connected to said main body having a forward cylinder head and a rear cylinder head, said rear cylinder head forming a vent hole;
(ii) a piston rod operatively connected to said passenger safety support mechanism slideably carried by said rear cylinder head and having a forward end disposed within said locking cylinder;
(iii) a first piston disposed within said cylinder and secured at the forward end of said piston rod, said first piston having an orifice;
(iv) a second piston disposed within said cylinder between said first piston and said forward cylinder head, said second piston defining first and second chambers within said locking cylinder;
(v) a compression spring separating said first and second pistons;
(vi) a third piston slidably mounted on said piston rod and disposed within said cylinder between said first piston and said rear cylinder head forming an air chamber therebetween; and
(vii) a valve in fluid communication with said first and second chambers, said valve having a closed state and an open state, wherein when said valve is in said closed state said first and second chambers are not in fluid communication, substantially locking said first and second pistons relative to said cylinder and substantially locking said height-adjusting mechanism relative to said main body, and wherein when said valve is in said open state said first and second chambers are in fluid communication, allowing motion of said first and second pistons relative to said cylinder and allowing motion of said height-adjusting mechanism relative to said main body, thereby permitting said height-adjusting mechanism, even in a substantially locked position relative to said support column, to move downwardly with respect to said support column, whereby excessive gravity force supplied to the passenger associated with the upward, downward or curved movement of the vehicle can be weakened by movement of said first piston towards said second piston within said locking cylinder.

11. A standing position support apparatus for an amusement vehicle, comprising:
(a) a main body of said amusement vehicle, which is free to move along a track;
(b) a standing position support column extending vertically from said main body;
(c) a height-adjusting mechanism movable vertically along said column and which comprises hydraulic locking means for locking said height-adjusting mechanism appropriate to the height of a passenger, said locking means comprising a shock absorbing spring connected to and supported by the base of said main body at one end and a locking cylinder having one end secured to said height-adjusting mechanism and supported by said shock absorbing spring at the other end, said locking cylinder being movable vertically along said support column, thus permitting said height-adjusting mechanism, even in a locked position, to move downwardly with respect to said support column, whereby excessive gravity force applied to the pasenger associated with the upward, downward or curved movement of the vehicle can be weakened; and
(d) a passenger safety support mechanism disposed on said height-adjusting mechanism to safely hold the passenger in a standing posture.

12. A standing position support apparatus for an amusement vehicle, comprising:
(a) a main body of said amusement vehicle, which is free to move along a track;
(b) a standing position support column vertically extending from said main body;

(c) a height-adjusting mechanism comprising a lift movable vertically along said support column and a hydraulic locking means for substantially locking said lift at a position appropriate to the height of a passenger;

(d) a passenger safety support mechanism for supporting the passenger in a standing posture, which is slidably mounted on said lift through the use of mutually spaced upper and lower support members;

(e) a spring support frame securely interposed between said upper and lower support members; and (f) shock absorbing springs provided, respectively, at an upper position and a lower position with respect to said spring support frame, thereby permitting said passenger safety support mechanism to slide vertically along said support column even in the locked position of said lift of said height-adjusting mechanism, whereby excessive gravity force applied to the passenger associated with the upward, downward and curved movement of the vehicle can be weakened.

13. A standing position support apparatus for an amusement vehicle, comprising:

(a) a main body of said amusement vehicle, which is free to move along a track;

(b) a turntable rotably connected to said main body comprising first locking means for locking the rotation of said turntable at a desired angle of the direction which the passenger selects;

(c) a standing position support column mounted on said turntable;

(d) a height-adjusting mechanism movable vertically along said support column and comprising second locking means for locking said height-adjusting mechanism at a position appropriate to the height of a passenger; and (e) a passenger safety support mechanism disposed on said height-adjusting mechanism for holding the passenger in a standing posture.

14. A standing position support apparatus for an amusement vehicle, comprising:

(a) a main body of said amusement vehicle, which is free to move along a track;

(b) a floor plate mounted on said main body with a spacing therebetween;

(c) a plurality of elastic damping bodies interposed between said floor plate and the upper surface of said main body to permit said floor plate to move rockingly;

(d) a standing position support column disposed on said main body and extending upwardly from said floor plate;

(e) a height-adjusting mechanism movable vertically along said support column and comprising locking means for locking said height-adjusting mechanism at a position appropriate to the height of a passenger; and (f) a passenger safety support mechanism mounted on said height adjusting mechanism for holding the passenger in a rockingly standing posture.

* * * * *